(12) United States Patent
Khlif

(10) Patent No.: US 6,441,385 B1
(45) Date of Patent: Aug. 27, 2002

(54) METHOD AND APPARATUS FOR OPTIMIZING ADJUSTMENT OF DISC HEAD SLIDER CURVATURE

(75) Inventor: Mohamed-Salah H. Khlif, Fridley, MN (US)

(73) Assignee: Seagate Technology, LLC., Scotts Valley, CA (US)

( * ) Notice: Subject to any disclaimer, the term of this patent is extended or adjusted under 35 U.S.C. 154(b) by 73 days.

(21) Appl. No.: 09/619,241

(22) Filed: Jul. 19, 2000

Related U.S. Application Data

(60) Provisional application No. 60/195,153, filed on Apr. 6, 2000, and provisional application No. 60/201,241, filed on May 1, 2000.

(51) Int. Cl.$^7$ ............................................. G11B 5/127
(52) U.S. Cl. ............... 250/548; 250/559.22; 360/235.1; 29/603.07; 29/603.09; 29/603.12
(58) Field of Search ...................... 250/548, 559.22, 250/559.27; 356/601, 511; 360/234.3, 235.1; 29/603.07, 603.09, 603.12, 603.16, 603.18, 898.13

(56) References Cited

U.S. PATENT DOCUMENTS

| | | | |
|---|---|---|---|
| 4,910,621 A | 3/1990 | Matsuda et al. | 360/104 |
| 5,220,471 A | 6/1993 | Matsuzaki | 360/103 |
| 5,237,476 A | 8/1993 | Bischoff et al. | 360/126 |
| 5,256,850 A | 10/1993 | Maegawa et al. | 219/121.69 |
| 5,266,769 A | 11/1993 | Deshpande et al. | 219/121.69 |
| 5,303,105 A | 4/1994 | Jorgenson | 360/106 |
| 5,442,850 A | 8/1995 | Kerth | 29/603 |
| 5,982,583 A | 11/1999 | Strom | 360/103 |
| 6,073,337 A | * 6/2000 | Strom | 29/603.12 |
| 6,075,604 A | 6/2000 | Crawforth et al. | 356/371 |
| 6,288,873 B1 | 9/2001 | Lundquist et al. | 360/234.6 |
| 6,321,440 B1 | 11/2001 | Crawforth et al. | 29/603.1 |

OTHER PUBLICATIONS

Photograph of TDK TPC ABS slider from Quantum Fireball 2 Drive, publicly on sale at least as early as Jan. 1, 1996.
Photograph of TDK AAB slider from Pike Disc Drive, publicly on sale at least as early as Jan. 31, 1996.
R. W. Stinnett and E. L. Neau "Ion Beam Surface Treatment", QM Technologies Inc. *An Interim Report,* Summer 1996, pp. 1–16.
R. Ebbutt and S. Danyluk, Ilan Weisshaus, "Method to Evaluate Damage Induced by Dicing and Laser Cutting of Silicon Wafers".

* cited by examiner

*Primary Examiner*—Robert H. Kim
*Assistant Examiner*—Glen Kao
(74) *Attorney, Agent, or Firm*—Westman, Champlin & Kelly

(57) ABSTRACT

An apparatus and method for adjusting curvature of a disc head slider having a bearing surface is provided. The apparatus includes a light source and an apparatus for controlling the light source. The light source is adapted to produce a light beam capable of altering material stresses in a working surface of the slider. The apparatus for controlling the light source is adapted for obtaining a measure of first and second curvature characteristics of the bearing surface and for scanning the light beam across the working surface in a pattern to alter the material stresses in the working surface such that the first and second curvature characteristics move to within predetermined specifications. The pattern is based on the measures of the first and second curvature characteristics and estimates of responses in the first and second curvature characteristics to the pattern.

17 Claims, 18 Drawing Sheets

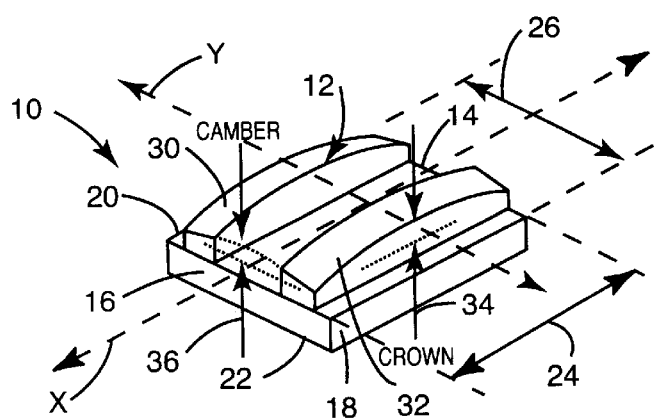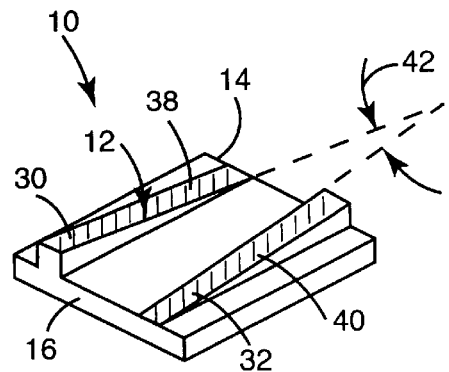
FIG. 1    FIG. 2
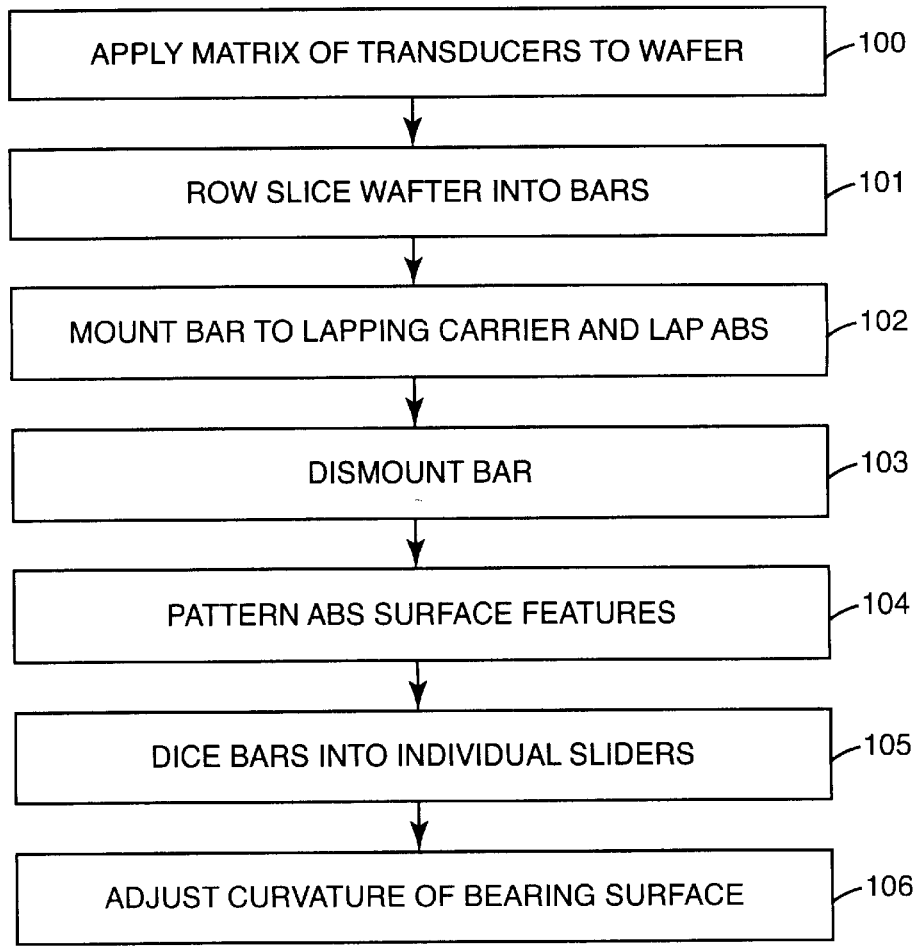
FIG. 3

METHOD AND APPARATUS FOR OPTIMIZING ADJUSTMENT OF DISC HEAD SLIDER CURVATURE

CROSS-REFERENCE TO RELATED APPLICATION

This application claims priority from U.S. Provisional Application No. 60/195,153, filed Apr. 6, 2000, and entitled "OPTIMIZATION ALGORITHM FOR A MAGNETIC HEAD SLIDER FLATNESS ADJUST" and from U.S. Provisional Application No. 60/201,241, filed May 1, 2000, and entitled "A METHOD FOR TWIST CONTROL ON A MAGNETIC HEAD SLIDER."

Cross-reference is also made to U.S. application Ser. No. 09/579,316, filed May 25, 2000, and entitled "SLIDER HAVING INDEPENDENTLY CONTROLLED CROWN AND CROSS CURVATURE AND METHOD OF CONTROLLINGCURVATURE;" U.S. application Ser. No. 09/566,412 filed May 8, 2000, and entitled "LASER EDGE TREATMENT OF SLIDERS;" U.S. application Ser. No. 09/594,335, filed Jun. 15, 2000, and entitled "METHOD AND APPARATUS FOR CONTROLLING TWIST CURVATURE OF A DISC HEAD SLIDER;" and to U.S. application Ser. No. 09/546,836, filed Apr. 11, 2000, and entitled "SLIDER HAVING THERMALLY APPLIED TENSILE STRESS FOR CURVATURE CONTROL AND METHOD OF APPLYING TENSILE STRESS," which are assigned to the same assignee.

FIELD OF THE INVENTION

The present invention is related to disc drive data storage systems and, more particularly, to a method of controlling curvature of a transducing head, such as a hydrodynamic bearing slider.

BACKGROUND OF THE INVENTION

A typical hard disc drive includes one or more rigid discs coated with a magnetizable medium for storage of digital information in a plurality of circular, concentric data tracks. The discs are mounted on a spindle motor, which causes the discs to spin and the surfaces of the discs to pass under respective head gimbal assemblies (HGAs). Head gimbal assemblies carry transducers which write information to and read information from the disc surface. An actuator mechanism moves the head gimbal assemblies from track to track across the surfaces of the discs under control of electronic circuitry.

The head gimbal assembly includes a gimbal (or flexure) and a slider. The gimbal provides a resilient connection that allows the slider to pitch and roll while following the topography of the disc. The slider includes a slider body having a bearing surface, such as an air bearing surface, which faces the disc surface. As the disc rotates, the air pressure between the disc and the air bearing surface increases, which creates a hydrodynamic lifting force that causes the slider to lift and fly above the disc surface. The transducer is typically mounted at or near the trailing edge of the slider In some applications, the slider flies in close proximity to the surface of the disc. This type of slider is known as a "pseudo-contact" slider, since the bearing surface of the slider can occasionally contact the surface roughness of the disc. In other applications, the slider is designed to remain in direct contact with the disc surface with substantially no air bearing. These sliders are referred to as "contact recording" sliders.

It is often desirable to fabricate a slider such that the bearing surface has a positive curvature along the length and width of the slider. Length curvature is known as crown curvature. Width curvature is known as cross or camber curvature. The proper setting and control of crown and cross curvature improves fly height variability over varying conditions, improves wear on the slider and the disc surface, and improves takeoff performance by reducing stiction between the slider and the disc surface. In addition, the slider preferably has no twist about its longitudinal or transverse axes. While twist does not directly effect fly height, high twist values, either positive or negative, can cause other negative tribological effects, such as increasing wear and inducing roll.

Curvature has been controlled in the past by lapping the bearing surface on a spherically-shaped lapping surface or on a flat lapping surface while rocking the slider body back and forth in the direction of the desired curvature. The amount of curvature is determined by the radius of the rocking rotation. This lapping process is difficult to control and results in large manufacturing tolerances.

U.S. Pat. No. 5,442,850 discloses a method of controlling crown and cross curvature by inducing a preselected amount of compressive stress within a selected section of the bearing surface by impinging the section with particles for a preselected amount of time. U.S. Pat. No. 5,266,769 discloses a process of controlling slider crown and cross curvature in which the air bearing surfaces are first patterned and then a chosen pattern of stress is produced on the back side of the slider by laser oblation or sand blasting to selectively remove stressed material and thereby create a desired crown and cross curvature of the bearing surface.

U.S. Pat. No. 5,982,583 discloses a method of effecting slider curvature through the application of laser-induced anisotropic tensile stress, which allows one of the crown and cross curvature to be changed to a greater extent than the other curvature. In addition, Seagate Technology, Inc. has used a process of creating scratches on the back side of the slider (the side opposite to the air bearing), lapping the bearing surface flat and then laser heat treating the scratches to reduce compressive stress caused by the scratches and thereby cause a positive curvature change in the bearing surface. This process is discussed in U.S. application Ser. No. 08/662,849, Filed Jun. 12, 1996.

While the above techniques can be used to adjust slider curvature, improved methods are desired for selecting a particular curvature treatment on a slider-by-slider basis given incoming curvature values, such as crown, cross and twist curvatures, and predetermined curvature responses.

SUMMARY OF THE INVENTION

One aspect of the present invention is directed to a method of controlling curvature of a disc head slider having a bearing surface. The method includes obtaining measures of first and second curvature characteristics of the bearing surface and selecting a first material stress pattern to be applied to a working surface of the slider based on the measure of the first curvature characteristic and a first target value. A change to the second curvature characteristic due to application of the first material stress pattern to the working surface of the slider is estimated, and based on this estimate, the first target value and the first material stress pattern are selectively changed. The first material stress pattern, as selectively changed, is then applied to the working surface of the slider to induce a change in the first curvature characteristic toward the first target value.

Another aspect of the present invention is directed to a method of controlling curvature of a disc head slider having a bearing surface. The method includes defining a respective specification range, including a nominal value, for twist, crown and cross curvatures of the bearing surface and obtaining a measure of the twist, crown and cross curvatures of the bearing surface. Material stresses on a working surface of the slider are selectively altered in a first pattern that is selected to induce a desired change in the twist curvature based on the measure of the twist curvature, the specification range for the twist curvature and estimated responses in the crown and cross curvatures to the first pattern. Material stresses on the working surface are selectively altered in a second pattern that is selected to induce a change in a least one of the crown and cross curvatures based on the measure of the crown and cross curvatures, the specification ranges for the crown and cross curvatures and estimated responses in the crown and cross curvatures to the second pattern.

Another aspect of the present invention is directed to a method of controlling curvature of a disc head slider having a bearing surface. The method includes obtaining a measure of twist, crown and cross curvatures of the bearing surface and selecting a first material stress pattern for inducing a change in the twist curvature in response to application of the first material stress pattern to a working surface of the slider, based on the measure of the twist curvature. A response in at least one of the crown and crown curvatures is estimated due to application of the first material stress pattern to the working surface of the slider. The first material stress pattern is selectively applied or not applied to the working surface of the slider, based on the estimated response. A second material stress pattern is selected for inducing a change in at least one of the crown and cross curvatures, based on the measure of the crown and cross curvatures, and is applied to the working surface of the slider.

Yet another aspect of the present invention relates to an apparatus for adjusting curvature of a disc head slider having a bearing surface. The apparatus includes a light source and an apparatus for controlling the light source. The light source is adapted to produce a light beam capable of altering material stresses in a working surface of the slider. The apparatus for controlling the light source is adapted for obtaining a measure of first and second curvature characteristics of the bearing surface and for scanning the light beam across the working surface in a pattern to alter the material stresses in the working surface such that the first and second curvature characteristics move to within predetermined specifications. The pattern is based on the measures of the first and second curvature characteristics and estimates of responses in the first and second curvature characteristics to the pattern.

BRIEF DESCRIPTION OF THE DRAWINGS

FIG. 1 is a perspective view of a disc head slider, as viewed from a bearing surface, which illustrates cross and crown curvature.

FIG. 2 is a perspective view of a disc head slider, as viewed from a bearing surface, which illustrates twist curvature.

FIG. 3 is a flow chart illustrating a slider fabrication process according to one embodiment of the present invention.

DETAILED DESCRIPTION OF ILLUSTRATIVE EMBODIMENTS

Figure 4:
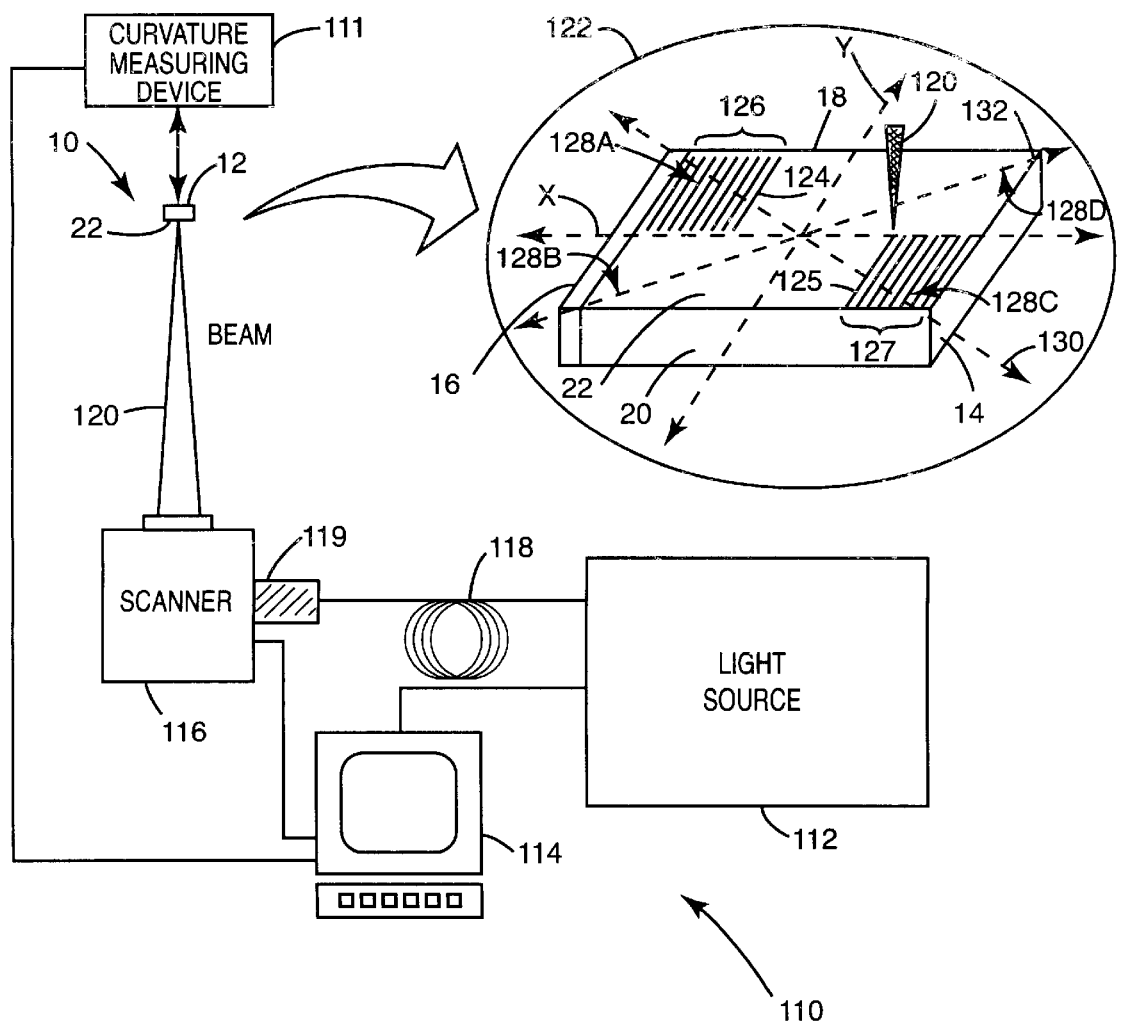
FIG. 4 is a diagram of an apparatus for adjusting slider curvature according to one embodiment of the present invention.

FIG. 1 is a perspective view of a disc head slider 10, as viewed from a bearing surface 12. Slider 10 has a leading edge 14, a trailing edge 16, side edges 18 and 20 and back surface 22. Slider 10 has a length 24, measured from leading edge 14 to trailing edge 16, and a width 26, measured from side edge 18 to side edge 20. In the embodiment shown in FIG. 1, bearing surface 12 includes side rails 30 and 32. However, slider 10 can include a variety of bearing surface geometries. These surface geometries can be configured for non-contact, direct-contact or pseudo-contact recording. Slider 10 carriers a read/write transducer (not shown), which is typically mounted along trailing edge 16, but can be positioned at other locations on slider 10 in alternative embodiments.

Slider 10 preferably has a positive curvature along length 24 and width 26. "Crown" curvature is a measure of the curvature of bearing surface 12 along length 24. Crown curvature is negative for a concave surface, positive for a convex surface and zero for a flat surface. "Cross" curvature is a measure of the curvature of bearing surface 12 along width 26. The sign of the cross curvature has the same convention as the sign of the crown curvature. Cross curvature is also known as "camber" curvature. A common method of measuring the crown and cross curvatures is to measure the differences 34 and 36 between the highest points along length 24 and width 26 and the lowest points along length 24 and width 26, respectively. Typical crown and cross curvatures are on the order of zero to 1.5 microinches for a "30 series" slider having a length of 49 mills and a width of 39 mills.

In addition, slider 10 should have no "twist" about its longitudinal axis X or its transverse axis Y. Twist is the tilt between rails 30 and 32, which can be caused by stresses in the slider substrate material. FIG. 2 is a perspective view of slider 10 illustrating twist along slider length 24. The amount of twist can be measured by fitting planes 38 and 40 to the bearing surfaces of rails 30 and 32 and measuring an angle 42 between the fitted planes 38 and 40. The sign of angle 42 indicates the direction of twist and the relative orientation of the rails to each other. The crown curvature, cross curvature and twist are controlled during fabrication of the slider body.

FIG. 3 is a flow chart illustrating a slider fabrication process according to one embodiment of the present invention. The slider body is formed from a substrate known as a wafer. At step 100, a matrix of transducers is applied to the top surface of the wafer. At step 101, the wafer is sliced along rows into a plurality of bars. The slicing operation is typically performed with a diamond-tipped saw blade or wheel. Each bar includes a plurality of individual slider bodies, with each slider body having a corresponding transducer. The sliced surfaces become bearing surface 12 and back surface 22, while the top surface of the wafer becomes trailing edge 16 of each slider body. The slicing process induces surface stress in bearing surface 12 and back surface 22 due to plastic deformation of the surfaces. This surface stress is typically compressive. In addition, the slicing wheel can form marks in bearing surface 12 and back surface 22 due to misalignment of the wheel and wheel vibration. Therefore, following the slicing operation, bearing surface 12 and back surface 22 are referred to as "rough sliced surfaces."

At step 102, each bar is mounted to a carrier, and the bearing surface 12 of each bar is machined by a lapping process prior to forming the bearing features. The lapping process is controlled to obtain a target throat height or target resistance for each transducer. At step 103, the bar is dismounted from the lapping carrier. At step 104, the bearing surface features are patterned by ion milling, chemical etching or reactive ion etching (RIE), for example, with one or more masking operations. Once the bearing surface features have been formed, the bars are diced along a plurality of diced lanes into individual slider bodies, at step 105. The diced surfaces become side edges 18 and 20 shown in FIG. 1. The stresses in the slider substrate material following the above fabrication steps cause each slider body to have some initial or "incoming" curvature, which is typically not at a desired value. The initial twist and crown and cross curvatures are then adjusted, at step 106, by altering the surface stresses on each slider.

FIG. 4 is a diagram of an apparatus 110 for adjusting the curvature of each slider 10 toward target curvature values according to predetermined specifications. Apparatus 110 includes curvature measuring device 111, light source 112, programmed computer 114, and scanner 116. Programmed computer 114 operates measuring device 111, light source 112, and scanner 116 according to a sequence of instructions stored in a memory (not shown), which is associated with the computer, and user commands provided by a user through a user interface (also not shown). The sequence of instructions, when executed by computer 114, causes apparatus 110 to measure the twist (direction and amplitude), crown curvature and cross curvature of bearing surface 12 with curvature measuring device 111. The sequence of instructions then cause apparatus 110 to alter the surface stresses on the back surface 22 (or alternatively bearing surface 12) of slider 10, based on a number of factors including the curvature measurements, predetermined curvature specifications, curvature target values, and predetermined curvature response characteristics. The curvature target values can be static or dynamic. In one embodiment of the present invention, apparatus 110 has one or more slider "nests" (not shown), wherein each nest holds a plurality of sliders 10 for treatment. Each slider is sequentially moved into a working position relative to light beam 120 and curvature measuring device 111. Measuring device 111 can include an interferometer, for example, which is capable of producing accurate and repeatable curvature measurements (i.e. "gage capable"). Other curvature measuring devices can also be used.

Apparatus 110 alters the surface stresses on back surface 22 by scanning light beam 120 across back surface 22 of slider 10 to melt the back surface in a selected melt pattern. The particular melt pattern and the amount of heat treatment are chosen to achieve a desired change in the curvature of bearing surface 12. In one embodiment, light source 112 is a fiber laser source, which generates coherent light having continuous power at a wavelength of about 1100 nm, which is delivered to scanner 116 over a 5 micrometer fiber-optic cable 118, for example. However, other heat sources or methods of altering material stresses on the working surface of slider 10 can also be used with the present invention. For example, the material stresses can be altered by lapping, shot pinning, sand blasting, liquid honing, etc. The surface shaping mechanism can be selected to suit a particular application.

Fiber-optic cable 118 is coupled to scanner 116 through a system of lenses 119, which expand the 0.5 mm diameter beam to a collimated beam of about 8 mm in diameter, for example. Scanner 116 passes the 8 mm beam through a two-axis galvanometer and then focuses the beam on back surface 22 through a flat-field objective lens. The two-axis galvanometer includes a set of two mirrors that allow planar x-y motion of the focused beam on the work surface of slider 10.

As beam 120 is scanned along the working surface of slider 10, the laser beam melts back surface 22 along very narrow and well-defined scan lines, which reduce or eliminate preexisting compressive stresses along the scan lines. When the molten material solidifies, new anisotropic tensile stress is added to back surface 22. The added anisotropic tensile stress causes the slider substrate to bulge from the surface opposite to the surface being treated. The wavelength of beam 120 is preferably in the infrared and provides for enough heating of back surface 22 without material removal. With a continuous wave laser beam, the tensile stress induced during cooling of the substrate material is aligned predominantly parallel to the scan direction. It has been found that proper placement and control of the laser scan lines can result in very localized stress management, which can be used to adjust twist, crown and cross curvature in bearing surface 12 so that these curvatures fit within predetermined specifications. The changes in curvature can be positive or negative, depending on the preexisting curvature conditions and the location of the scan lines on back surface 22 or bearing surface 12.

1. Twist Adjustment

Detail area 122 shows an example of a laser scan melt pattern applied by scanner 116 according to one embodiment of the present invention for adjusting twist. It has been found that the twist curvature response of a slider is sensitive to the location of the melt pattern on the working surface of the slider. Hence, various twist curvature responses can be obtained by varying the melt pattern and the location of the pattern on the working surface. In the example shown in detail area 122, the melt patterns are formed on the back surface of the slider. However, it should be understood that locating such melt patterns on the air bearing surface of the slider would create generally equal and opposite results as when formed on the back surface of the slider.

Based on the definition of twist and how it is measured, it has been found that the twist value can be effectively controlled by selectively altering surfaces stresses on the bearing surface or the back surface of the slider in a pattern that is asymmetric to both the longitudinal axis X and the transverse axis Y of the slider. In particular, it has been found that large changes in twist can be realized by treating the slider surface in opposing corners of the slider, along a selected diagonal. These corners have higher bending flexibility, which has been verified with empirical data.

For example, beam 120 can form a melt pattern with one or more twist control bands 126 and 127, which are located in opposing corners 128A and 128C, along diagonal 130. Bands 126 and 127 are formed of one or more laser scan lines 124 and 125, respectively. Alternatively, bands 126 and 127 can be applied in corners 128B and 128D, along diagonal 132, for achieving an opposite change in the twist curvature. The melt pattern can be formed in one step or a sequence of steps, which are interleaved with one or more curvature measurements.

Once measuring device 111 has measured the initial or "incoming" twist value (magnitude and direction) of slider 10, computer 114 makes a decision as to the laser heat treatment pattern that slider 10 should receive. The sign of the measured twist value determines the location of the laser heat treatment pattern on the working surface (e.g. along diagonal 130 or diagonal 132), and the magnitude of the measured twist value determines the amount of treatment needed.

Figure 5:
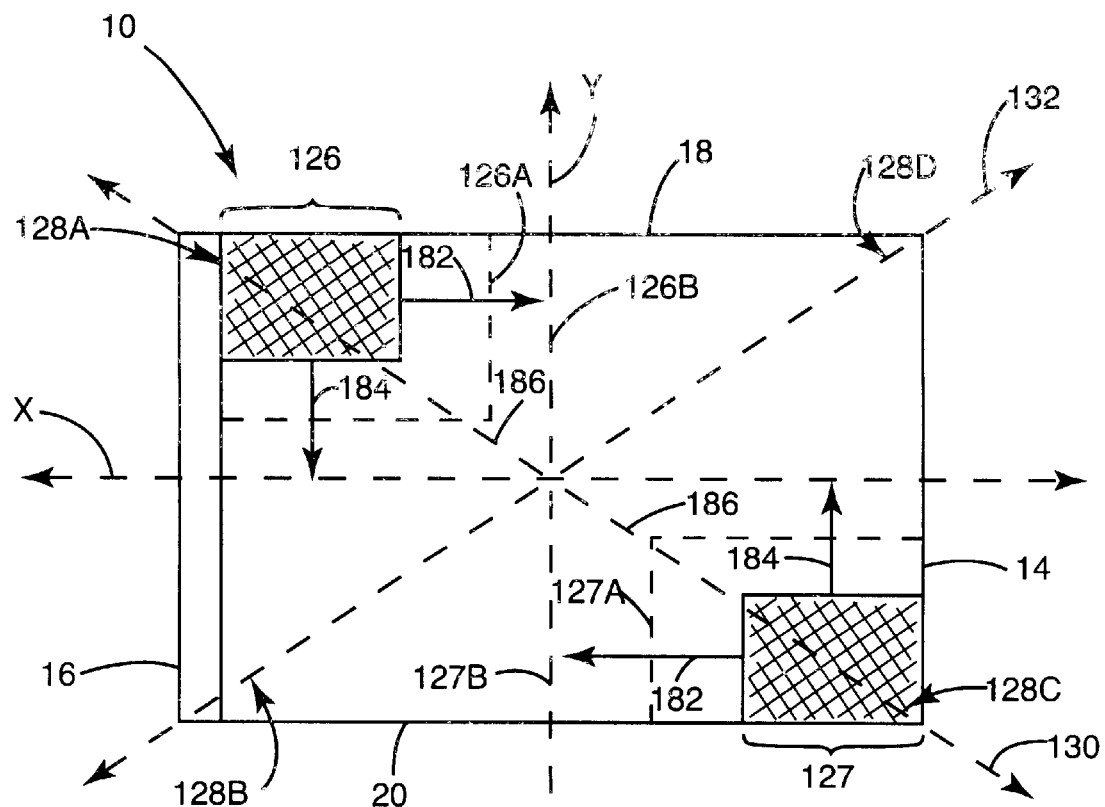
FIG. 5 is a diagram illustrating an example of an asymmetric melt pattern for treating sliders having an incoming negative twist value.

FIG. 5 is a diagram, which illustrates how bands 126 and 127 can be selectively increased or decreased as needed to achieve different levels of twist control. The same reference numerals are used in FIG. 5 as were used in FIG. 4 for the same or similar elements. In one embodiment, laser treatment starts with a laser scan line applied at an outermost limit of each band on back surface 22, and proceeds with subsequent scan lines positioned progressively towards an innermost limit of each band to achieve successively greater amounts of change in the twist. Various sizes of bands 126 and 127 are shown by dashed lines 126A, 126B, 127A and 127B.

The size of each band 126 and 127 can be increased in different ways in alternative embodiments of the present invention. Each band 126 and 127 can grow horizontally along longitudinal axis X, as shown by arrows 182, or vertically along transverse axis Y, as shown by arrows 184. In yet another alternative embodiment, each band 126 and 127 can grow both vertically and horizontally or along the respective diagonal 130 or 132, as shown by arrows 186. Bands 126 and 127 can have equal or distinct growth size rates.

Bands 126 and 127 can be increased through a plurality of input process variables. For example, the size of each band can be increased or decreased by varying the number of equidistant laser scan lines within each band. Alternatively, the number of laser scan lines in each band is fixed, but the line dimensions (length or width) are allowed to vary from one slider to the next based on the amount of twist adjustment that is needed. A given band size would therefore result in a specific twist response or change. Within a given band, the order of scanning the laser lines may or may not effect the twist response, depending on the' particular application.

In another embodiment, the size of bands 126 and 127 have fixed dimensions. With the size of bands 126 and 127 fixed, other parameters are used as process variables. For example, the number of scan lines in each band 126 and 127 can be varied by varying the line-to-line spacing within each band. Alternatively, the number of scan lines and the line-to-line spacing are both fixed, while other inputs such as laser power or scanning speed can serve as process input variables. The collection of laser scan lines in each band 126 and 127 can be parallel to longitudinal axis X, parallel to transverse axis Y or at an angle that is perpendicular to the respective diagonal 130 or 132, for example.

2. Crown and Cross Curvature Adjustment

Figure 6:
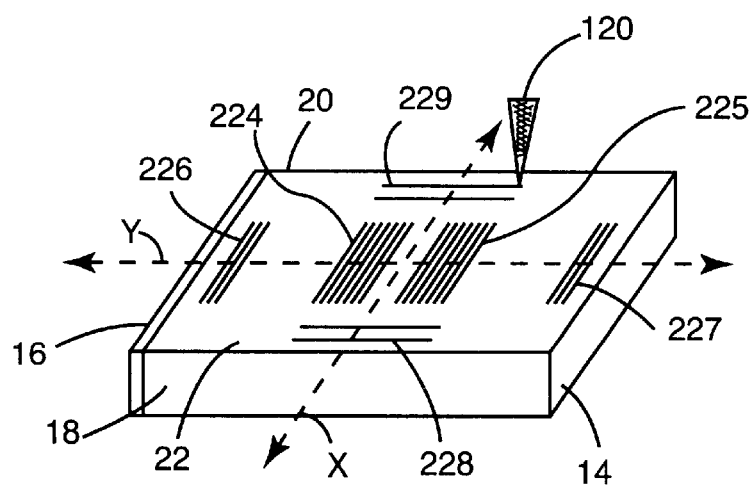
FIG. 6 illustrates a laser scan pattern that is adapted to adjust crown and cross curvatures of a slider according to one embodiment of the present invention.

FIG. 6 is a perspective view of back surface 22, which illustrates a laser scan pattern that is adapted to adjust the crown and cross curvatures of slider 10 according to one embodiment of the present invention. In this embodiment, one or more scan lines 224 and 225 are applied in a central region of back surface 22 in a direction parallel to transverse slider axis "X" to provide a coarse adjustment of the crown and cross curvatures. In this area, the crown and cross curvature responses (i.e. resulting changes in curvature due to an applied scan line) are somewhat coupled to one another, as described in more detail below. The number and spacing of scan lines 224 and 225 can be controlled to achieve a desired initial change in crown and cross curvature.

After applying scan lines 224 and 225, the crown and cross curvatures can again be measured, and any final curvature changes can be made by applying one or more scan lines along the periphery of back surface 22. For example, it has been found that the cross curvature can be adjusted with substantially no change in the crown curvature by applying one or more scan lines 226 and 227 in the peripheral areas near leading and trailing edges 14 and 16 of slider 10, in a direction parallel to transverse axis X. Similarly, it has been found that the crown curvature can be adjusted with substantially no change in the cross curvature by applying one or more scan lines 228 and 229 in the peripheral areas near side edges 18 and 20, in a direction parallel to longitudinal axis Y. Again, the number and spacing of the scan lines 226, 227, 228 and 229 can be controlled to achieve a desired final change in the crown and cross curvatures.

Figure 7:
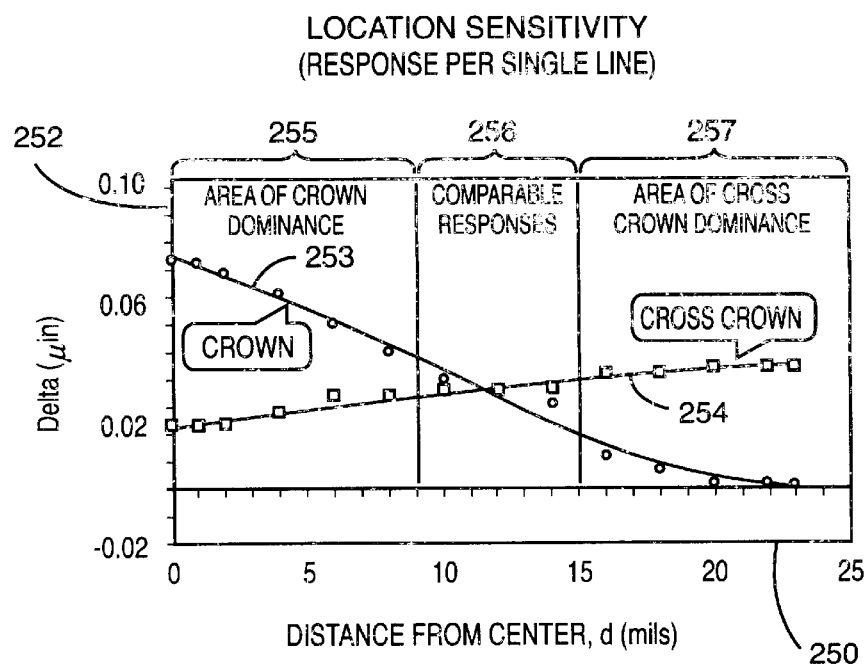
FIG. 7 is a graph which illustrates sensitivity of a slider's curvature response to the location of a continuous wave laser beam treatment on the slider substrate.

FIG. 7 is a graph which illustrates the crown and cross curvature sensitivity of slider 10 to the location of the laser scan lines on the slider substrate. X-axis 250 represents distance in mils ($1\times10^{-3}$ inches) along the slider length from the center of the slider substrate outwardly toward the leading and trailing edges. Y-axis 252 represents amplitude of curvature change in microinches for a pair of laser scan lines, which are symmetric about the slider's transverse axis and perpendicular to the slider's longitudinal axis (similar to lines 224–227 in FIG. 6). Line 253 represents the change in crown curvature, and line 254 represents the change in cross curvature.

In the area 255 from 0 mils to about 9 mils from the slider center, a single laser scan line results in a greater change in crown curvature than cross curvature. This central area is therefore an area in which the crown curvature response dominates the cross curvature response for a laser scan line extending perpendicular to the slider's longitudinal axis. In area 256 from about 9 mils to about 15 mils from the slider center, a single laser scan line oriented perpendicular to the slider's longitudinal axis results in comparable responses in the crown and cross curvatures.

In area 257 from about 15 mils from the slider center to the leading and the trailing edges of the slider, the response in cross curvature dominates the response in crown curvature.

When the laser beam is scanned parallel to the longitudinal axis of the slider a similar behavior is obtained, but with the dominance regions being inverted for crown and cross curvatures. Thus, the cross curvature response is more dominant at the center of the slider, while the crown curvature response is more dominant at the areas adjacent to the side edges of the slider.

Given the behavioral response shown in FIG. 7, an algorithm can be formed to define, for each incoming slider, a plurality of laser burn patterns that will adjust the crown and cross curvatures of the slider to the desired targets given the set of incoming crown and cross curvature values for that slider. Looking at FIG. 7, the areas 257 on the slider surface that are adjacent to the leading and trailing edges can provide for adjustment of cross curvature completely or nearly completely independent of any change in crown curvature. Likewise, the areas (similar to area 257 in FIG. 7) adjacent to the side edges of the slider can provide for adjustment of crown curvature without, or substantially without, any change in cross curvature. These areas are referred to as independent (or free) crown and cross curvature adjustment bands.

The middle areas 255 and 256 of the slider surface, which are bounded by the independent bands, are areas in which the crown and cross curvature responses are coupled with one another. Any change in crown curvature will be accompanied by a change in cross curvature and vice versa. However, based on the sensitivity graph shown in FIG. 7, the relative changes in crown and cross curvatures can still be controlled somewhat within the middle area. Laser scan lines positioned closer to the center of the slider in area 255 and oriented in a direction perpendicular to the slider's longitudinal axis will induce a greater change in crown curvature than cross curvature. However, the difference in crown and cross curvature responses reduces as the scan lines are progressively moved away from the center of the slider. Laser lines positioned in area 256 adjacent to the independent cross curvature bands will result in cross curvature responses that are more comparable to the crown curvature responses, but the amount of cross curvature change for each scan line decreases as the scan lines are moved towards the center of the slider.

Since the crown and cross curvature responses are coupled with one another in the middle areas of the slider, these areas can be used for an initial, or "coarse" adjustment of the crown and cross curvatures, whereas the independent crown and cross curvature areas can be used during a second, "fine" curvature adjustment step in one embodiment of the present invention.

Figure 8:
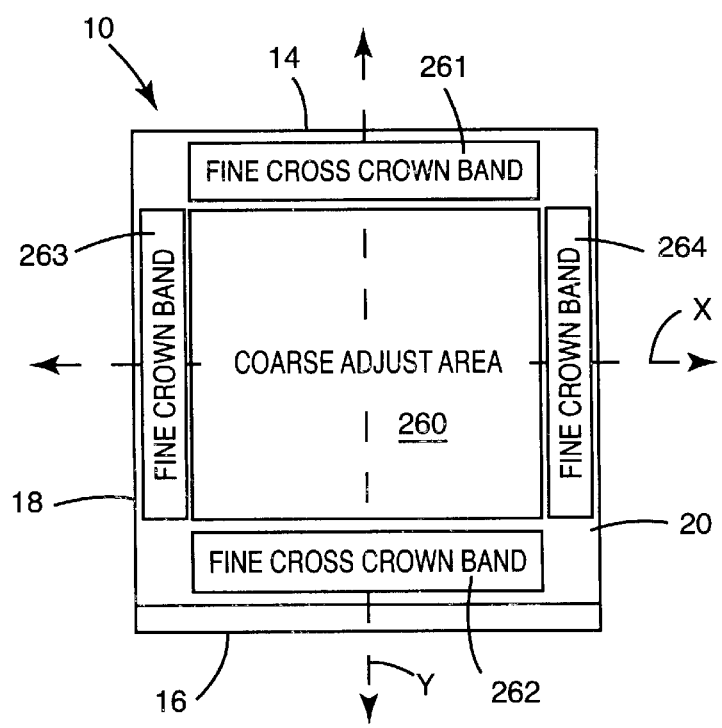
FIG. 8 is a diagram which illustrates the relative locations of coarse and fine curvature adjustment areas on the working surface of the slider.

FIG. 8 is a diagram which illustrates the relative locations of the coarse and fine curvature adjustment areas on the working surface of the slider. In the embodiment shown in FIG. 8, this working surface is back surface 22. The same reference numerals are used in FIG. 8 as were used in the previous figures for the same or similar elements. The working surface of slider 10 is divided into a coarse adjust area 260, fine cross curvature bands 261 and 262 and fine crown curvature bands 263 and 264. Curvature adjustments in coarse adjust area 260 are made by forming one or more continuous wave laser scan lines across coarse adjust area 260 in a direction perpendicular to longitudinal slider axis Y (i.e. parallel to leading edge 14 and trailing edge 16). Fine cross curvature adjustments are made by forming continuous wave laser scan lines along fine cross curvature bands 261 and 262 in a direction perpendicular to longitudinal axis Y. Fine crown curvature adjustments are made by forming continuous wave laser scan lines along fine crown curvature bands 263 and 264 in a direction parallel to longitudinal axis Y. The cross curvature adjustments made in fine cross curvature bands 261 and 262 are made substantially independent of any change in the crown curvature, and the crown curvature adjustments made in fine crown curvature bands 263 and 264 are made substantially independent of any changes in cross curvature.

Figure 9:
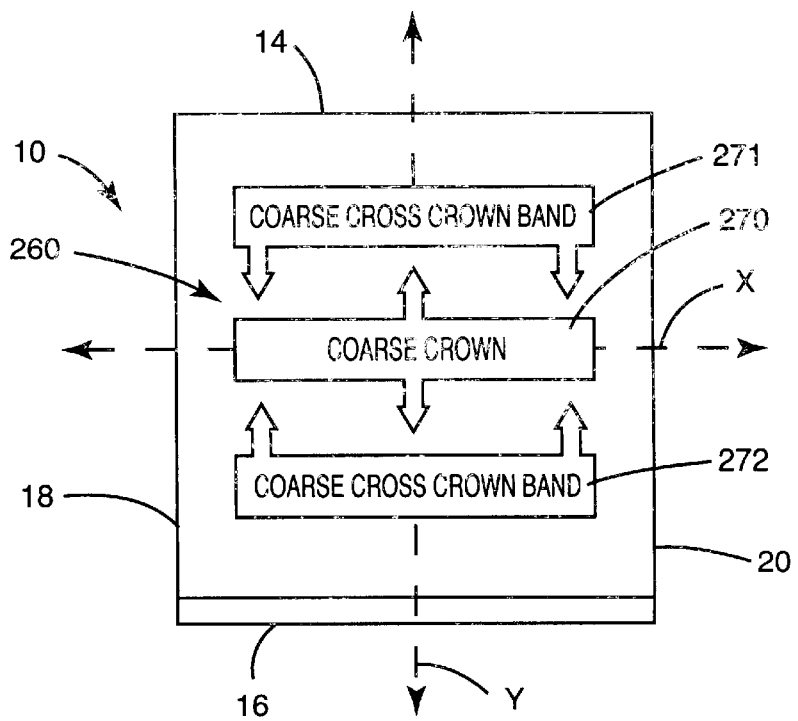
FIG. 9 is a diagram which illustrates the relative locations of three curvature adjustment bands within the coarse adjust area shown in FIG. 8.

Coarse adjust area 260 is divided into three bands in one embodiment of the present invention in order to take advantage of the differing curvature responses shown in FIG. 7. FIG. 9 shows the location of each of these three bands on the slider's working surface. Coarse adjust area 260 includes coarse crown band 270, at the midpoint of the slider's length, and coarse cross bands 271 and 272. Coarse crown band 270 corresponds to the crown area of dominance 255 shown in FIG. 6. Coarse cross bands 271 and 272 correspond to the left most portion of the area of cross curvature dominance in FIG. 7, between about 12 mils and about 15 mils along X-axis 250. The algorithm used to define the laser scan line pattern for a particular slider originates coarse cross bands 271 and 272 at an area close to fine cross bands 261 and 262 (shown in FIG. 8) and grows these bands inwardly as needed towards a central location within coarse adjust area 260. The algorithm originates coarse crown band 270 at a central location in coarse adjust area 260 and grows the band outwardly as needed toward coarse cross bands 271 and 272.

3. Design Curves For Curvature Control

A design curve is a mathematical model that can be used to predict the outcome of a function based on the input variables to the model. For the process of adjusting the curvature of a disc head slider, the desired outcome is a curvature magnitude and direction. The input variables to this process include all process factors that can be adjusted individually or collectively in order to bring about the desired outcome. Given a constant slider substrate material, these input variables include laser operating mode, laser power, focused laser beam spot size, laser beam scanning speed, line-to-line spacing (line pitch, P), number of scan lines(N), scan band size (B), location of band, scan orientation, initial material stress conditions on the working surface of the slider and any interactions between these variables. Since measuring device 111 is assumed to be gage capable and produces accurate and repeatable measurements, it is not included as an input variable to the model.

For better process control, some of these input variables may be preferred as process control inputs over other input variables. Also, the process model can be simplified by fixing some of these input variables and assuming other variables are constant, or at least within a certain range, so that they may be eliminated from the model.

The scan band size B is an integration of both the line-to-line spacing P and the number of scan lines N in the band. Thus, the scan band size is given by:

$$B = P \times (N-1) \qquad \text{Eq.1}$$

From Eq.1, various embodiments are possible. In one embodiment, the band size is fixed to a maximum, and either P or N (but not both) is used as the process input variable in the mathematical prediction model. In the case where P is used as the input variable, N will be deduced from Eq.1 and vice-versa. With this embodiment, respective bands of the melt pattern will originate and terminate at the same locations on the surface being treated.

In another embodiment, N is fixed and B or P is allowed to vary. With this embodiment, there are several possible configurations. In one configuration, the band will always start at a first end (such as an outer limit) of the designated area of the burn pattern and subsequent scan lines in the band progress towards the other end (such as the inner limit) of the designated area. The band will have a fixed number of scan lines, but the line spacing or pitch "P" differs from one slider to the next. In another configuration, the band always starts at the second end (such as the inner limit) of the designated area and progresses towards the first end, (such as the outer limit). In yet another configuration, the band will always start with a scan line at a central location within the designated area and progress alternately toward both the inner and outer limits.

In another embodiment, P is fixed and N or B is used as the process input variable. The same band configurations discussed above also apply to this embodiment. With this embodiment, scan lines will always be spaced the same distance apart, from one slider to the next and the number of scan lines, N, is used as the input variable. In yet another embodiment, a melt pattern may be formed by various combinations of each of the embodiments and configurations discussed above.

4. Mathematical Models of the Curvature Responses Where the Number of Scan Lines N is the Sole Input Variable.

In the following models, the number of scan lines, N, is used as the sole process input variable. The line-to-line spacing, P, is fixed, and the scan band size, B, varies proportionally with N. All bands (except coarse crown band 270) on the melt pattern start from their outer limits and grow toward their inner limits of the designated area on the pattern with each successive scan line, and scanning is performed in a direction parallel to the transverse axis Y (except for fine crown bands 263 and 264).

a. Twist Adjust

Figure 10:
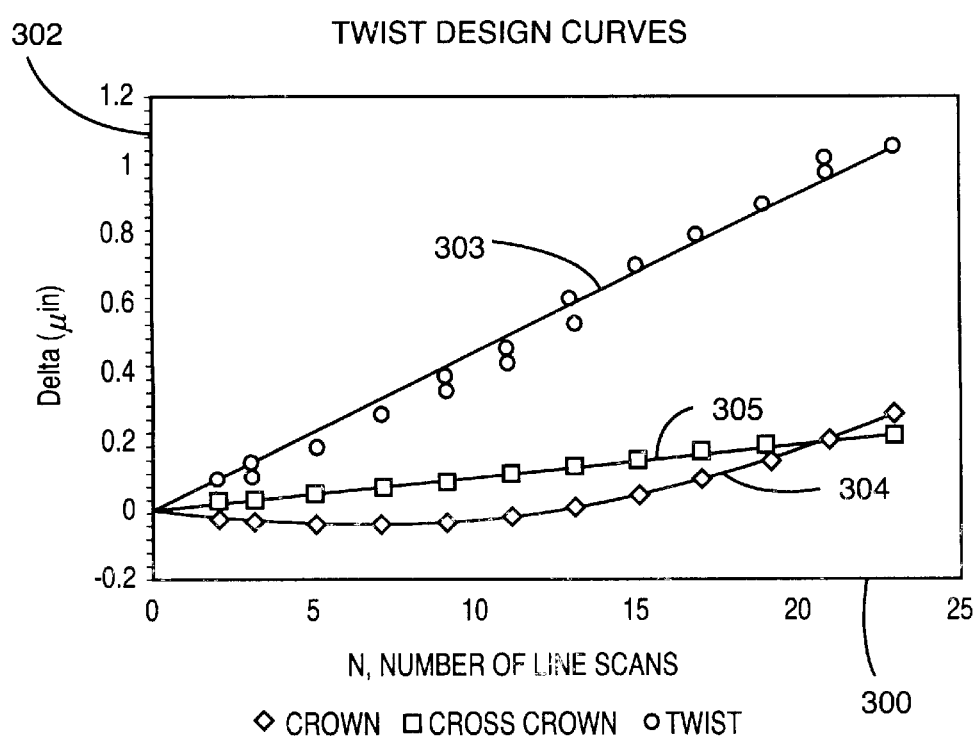
FIG. 10 is a graph illustrating twist response as a result of progressively increasing a number of equidistant scan lines within each of the bands shown in FIG. 5.

FIG. 10 is a graph illustrating the twist response as a result of progressively increasing the number of equidistant scan lines, $N_T$, within each of the twist control bands shown in FIG. 4. X-axis 300 represents the number of scan lines, $N_T$, and Y-axis 302 represents change in microinches. Line 303 represents the change in twist, $\Delta T_T$, line 304 represents the change in crown curvature, $\Delta C_T$, and line 305 represents the change in cross curvature, $\Delta X_T$, where the "T" subscripts indicate the changes are a result of the laser scan lines applied in the twist control bands. During the twist adjustment step, the change in twist is accompanied by a small change in crown and cross curvature. As described below, the changes in crown and cross curvature are taken into account during subsequent crown and/or cross curvature control steps. Line 303 can be approximated by the equation, $$\Delta T_T = a_T \cdot N_T + b_T \qquad \text{Eq.2}$$

where $a_T$ and $b_T$ are constants. Line 304 can be approximated by, $$\Delta C_T = c_T \cdot N_T^2 + d_T \cdot N_T \qquad \text{Eq.3}$$

where $C_T$ and $d_T$ are constants. Line 305 can be approximated by the equation, $$\Delta X_T = e_T \cdot N_T \qquad \text{Eq.4}$$

where $e_T$ is a constant. Given these equations for the twist response, the curvature control algorithm implemented by apparatus 110, shown in FIG. 4, can calculate the appropriate number of scan lines to form within each twist adjustment band for a particular slider and predict the accompanying changes to the crown and cross curvatures.

b. Coarse Crown and Cross Adjust

Figure 11:
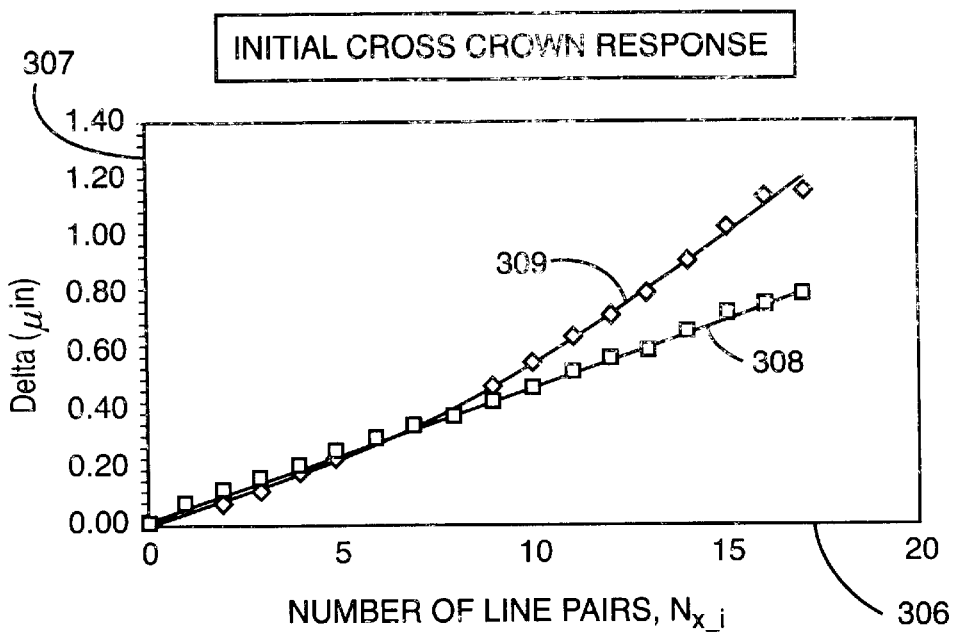
FIG. 11 is a graph illustrating initial curvature change as a result of progressively increasing a number of equidistant scan lines within coarse cross bands shown in FIG. 9.

FIG. 11 is a graph illustrating the initial curvature responses as a result of progressively increasing the number of equidistant scan lines within the coarse cross bands 271 and 272 shown in FIG. 9. In the coarse cross bands, $N_{X\_i}$ represents the number of pairs of scan lines put symmetrically in bands 271 and 272. X-axis 306 represents the number of scan line pairs $N_{X\_i}$, and Y-axis 307 represents the change in curvature in microinches. Line 308 represents the change in cross curvature $\Delta X_{X\_i}$, and line 309 represents the change in crown curvature $\Delta C_{X\_i}$. During the initial cross curvature adjustment step, the change in cross curvature is accompanied by a change in crown curvature. This is due to these parameters being coupled to one another within coarse adjust area 260 shown in FIG. 8. Line 308 can be approximated by, $$\Delta X_{X\_i} = a_{X\_i} \cdot N_{X\_i} \qquad \text{Eq.5}$$

where $a_{X\_i}$ is a constant. Line 309 can be approximated by, $$\Delta C_{X\_i} = c_{X\_i} \cdot N_{X\_i}^2 + d_{X\_i} \cdot N_{X\_i} \qquad \text{Eq.6}$$

where $c_{X\_i}$ and $d_{X\_i}$ are constants.

Figure 12:
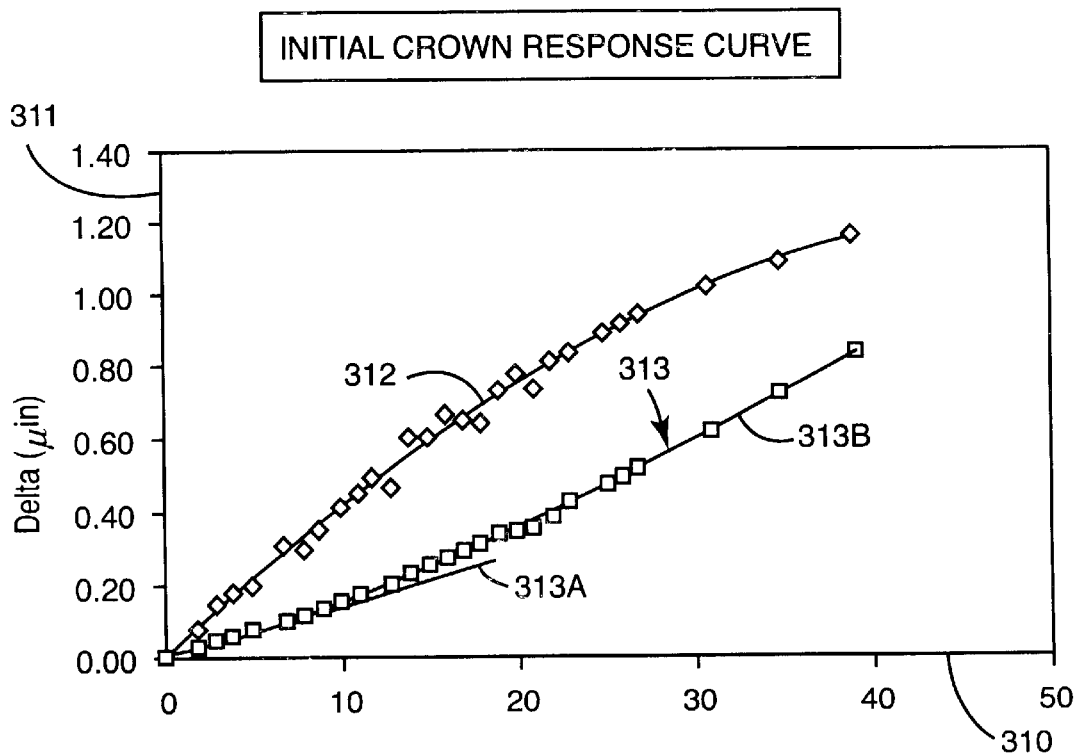
FIG. 12 is a graph illustrating initial curvature change as a result of progressively increasing a number of scan lines within a coarse crown band shown in FIG. 9.

FIG. 12 is a graph illustrating the curvature change as a result of increasing the number, $N_{C\_i}$, of scan lines placed within coarse crown band 270 (shown in FIG. 9). X-axis 310 represents the number of scan lines placed in coarse crown band 270, and Y-axis 311 represents the curvature change in microinches. Line 312 represents the resulting change in crown curvature, and line 313 represents in the resulting change in cross curvature. Line 312 can be approximated by, $$\Delta C_{C\_i} = e_{C\_i} \cdot N_{C\_i}{}^2 + f_{C\_i} \cdot N_{C\_i} \quad \text{Eq.7}$$

where $e_{C\_i}$ and $f_{C\_i}$ are constants. Line 313 has a substantially linear section 313A, which can be approximated by, $$\Delta X_{C\_i} = b_{C\_i} \cdot N_{C\_i} \quad \text{Eq.8}$$

where $b_{C\_i}$ is a constant. As line 313 is extended beyond about 25 lines on X-axis 310, line segment 313B is substantially quadradic and can be approximated by, $$\Delta X_{C\_i} = g_{C\_i} \cdot N_{C\_i}{}^2 + h_{C\_i} \cdot N_{C\_i} \quad \text{Eq.9}$$

where $g_{C\_i}$ and $h_{C\_i}$ are constants. As can be seen in FIG. 12, the initial change in crown curvature is accompanied by an initial change in cross curvature.

c. Fine Crown and Cross Adjust

Figure 13:
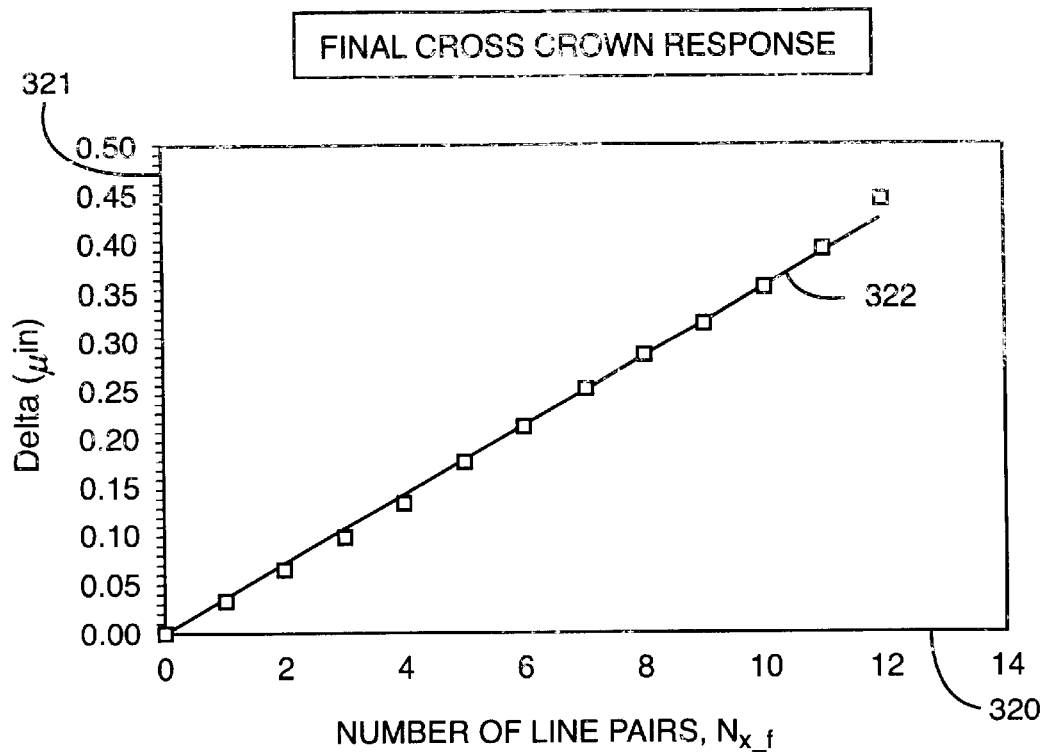
FIGS. 13 and 14 are graphs showing final curvature changes as a result of progressively increasing a number of scan lines within fine cross bands and fine crown bands, respectively, shown in FIG. 8.

During the fine curvature adjustment step, laser scan lines are formed in the fine cross bands 261 and 262 and fine crown bands 263 and 264 (shown in FIG. 8). FIG. 13 is a graph showing the final cross curvature response. X-axis 320 represents the number of line pairs, $N_{X\_f}$, placed symmetrically within fine cross bands 261 and 262, and Y-axis 321 represents the resulting curvature change in microinches. Line 322 represents an approximation of the resulting change in cross curvature. This change can be approximated by, $$\Delta X_{X\_f} = a_{X\_f} \cdot N_{X\_f} + b_{X\_f} \quad \text{Eq.10}$$

where $a_{X\_f}$ and $b_{X\_f}$ are constants.

Figure 14:
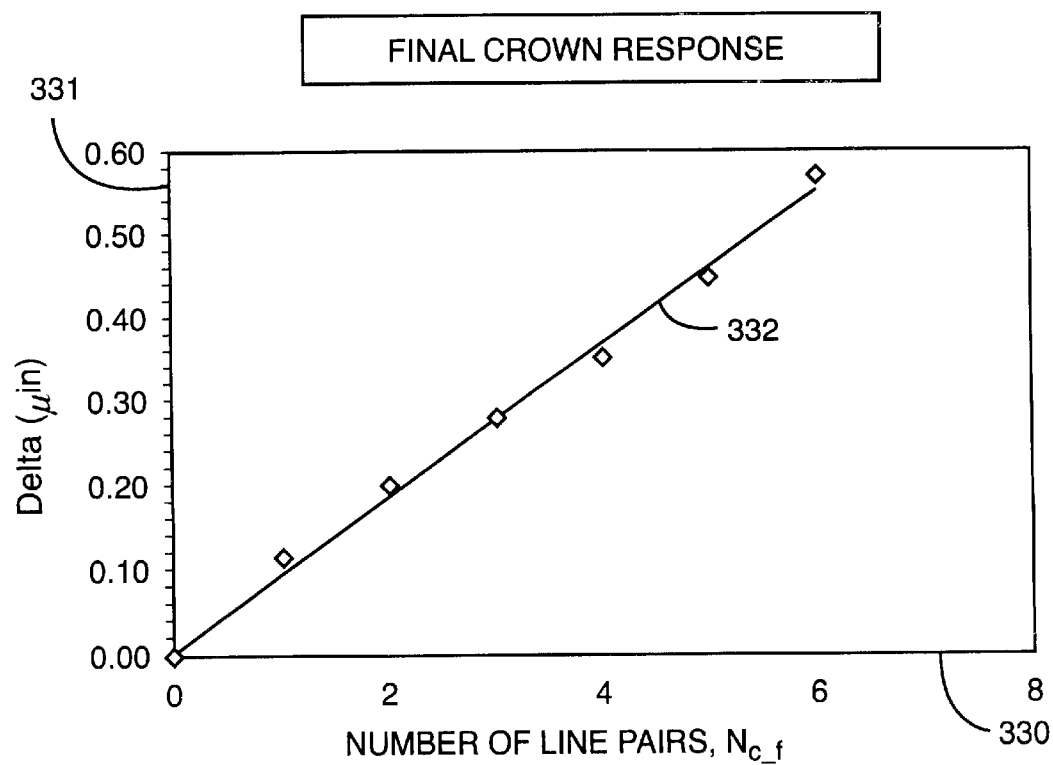

FIG. 14 is a graph illustrating the final crown curvature response. X-axis 330 represents the number of line pairs $N_{C\_f}$, placed symmetrically within the fine crown bands 263 and 264, and Y-axis 331 represents the resulting curvature change in microinches. Line 332 represents the final crown curvature change, which can be approximated by, $$\Delta C_{C\_f} = e_{C\_f} \cdot N_{C\_f} + f_{C\_f} \quad \text{Eq.11}$$

where $e_{C\_f}$ and $f_{C\_f}$ are constants.

5. Curvature Control Algorithm

Due to the interactions between laser scan treatments for adjusting twist, crown and cross curvatures and the limited area on the slider surface, there is often a trade-off between these parameters when attempting to reach predetermined curvature targets. Adjustment of one curvature value may impair or assist in the adjustment of another curvature value. The curvature control algorithm implemented within apparatus 110 (shown in FIG. 4) takes these factors into consideration in an attempt to increase yield in which all three curvature values can be brought within predetermined specifications and distributions of final curvature values can be reduced.

In one embodiment, the algorithm adjusts curvature in two steps. During an initial, "coarse" adjustment step, twist is selectively adjusted to its final output value, while crown and cross curvatures are brought to initial targets. During the final, "fine" adjustment step, crown and cross curvatures are brought to final targets.

The initial crown and cross curvature targets are determined based on the incoming curvature values, and these targets are dynamic as needed to ensure that both values can be adjusted to predetermined specifications. Also, a decision as to whether twist adjustment will be performed on a particular slider is based on the incoming curvature values, as measured by curvature measuring device 111. Thus, the twist adjustment decision is performed on a per-slider basis, rather than a per-product type basis. The initial crown and cross curvature targets can range from a selected lower limit to a selected upper limit for each value, thus giving all curvatures a chance to meet specifications.

Figure 15:
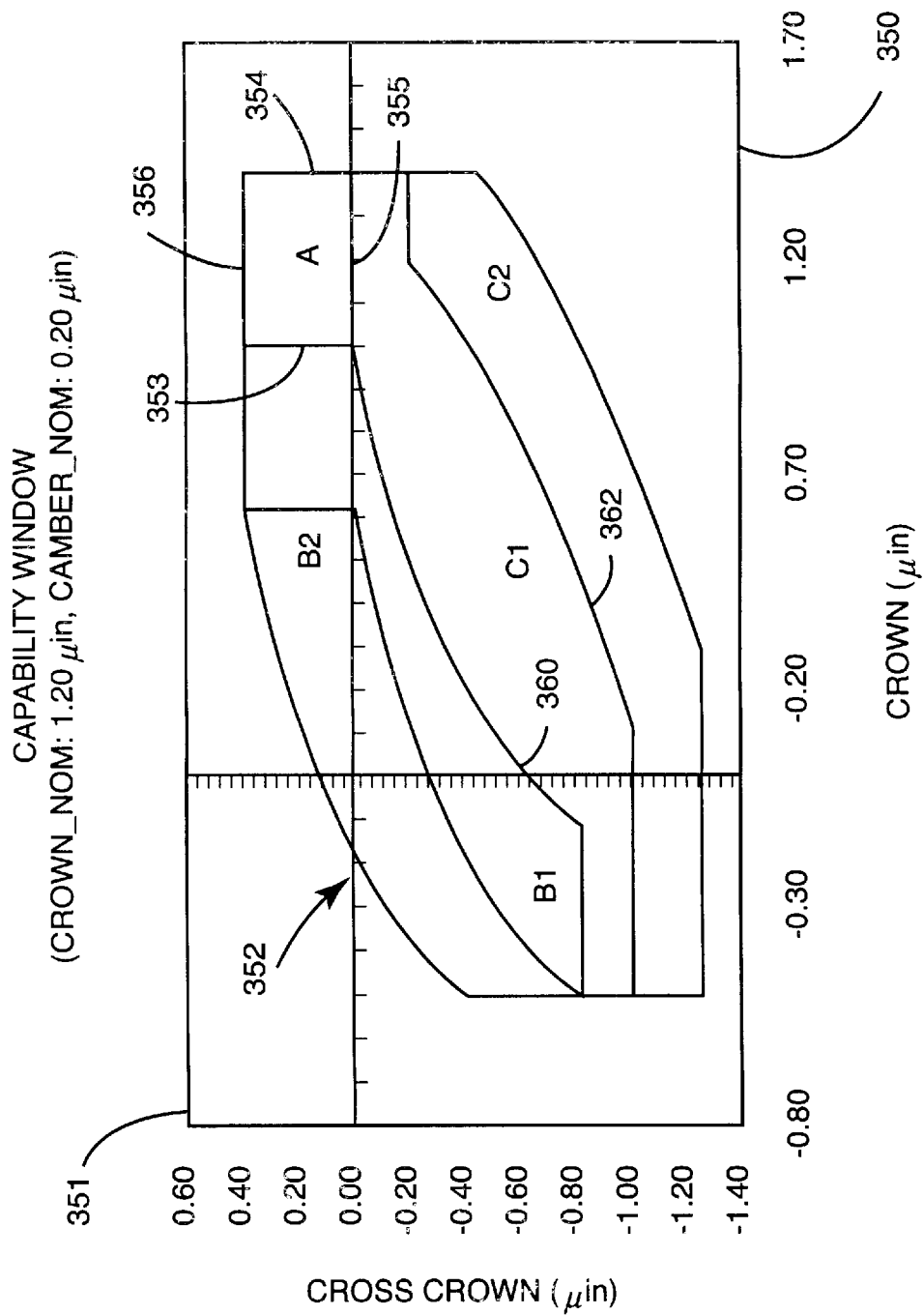
FIG. 15 is a graph illustrating a curvature adjustment capability window on which the curvature control algorithm is based, according to one embodiment of the present invention.

FIG. 15 is a graph illustrating a curvature adjustment capability window 352 on which the curvature control algorithm is based, according to one embodiment of the present invention. Based on the location of the incoming crown and cross curvature values within capability window 352, the curvature control algorithm makes decisions as to whether to apply twist control and the amount and nature of curvature adjustments. X-axis 350 represents the incoming crown curvature in microinches, and Y-axis 351 represents the incoming cross curvature in microinches. Window 352 represents a set of incoming crown and cross curvature values that can be adjusted with apparatus 110 to reach predetermined specifications. The particular values shown in FIG. 15 are provided as examples only.

Window 352 is divided into five regions, labeled "A", "B1", "B2", "C1" and "C2". Region A represents a set of crown and cross curvature values that are within a predetermined tolerances of desired nominal crown and cross curvatures that are located at the center of region A. In the embodiment shown in FIG. 15, the desired nominal crown curvature is 1.2 microinches and the desired nominal cross curvature is 0.2 microinches. Lines 353 and 354 represent a crown curvature lower limit, $C_{LL}$, and a crown curvature upper limit, $C_{UL}$, respectively. Lines 355 and 356 represent a cross curvature lower limit, $X_{LL}$, and a cross curvature upper limit, $X_{UL}$, respectively. For sliders having incoming crown and cross curvature values within region A, the initial crown and cross curvature adjustment steps are skipped. Only a final adjustment toward the nominal values is needed. Also, the amount of twist control for these sliders is limited, such that any resulting changes in crown and cross curvature do not cause the crown and cross curvature values to go out of region A.

Line 360, which divides regions B1 and B2 from regions C1 and C2, is a target divider line. Sliders having incoming curvature values within areas B1 and B2 have the cross curvature as a primary curvature target, since more adjustment needs to be made to the crown curvature than the cross curvature. Sliders having incoming crown and cross curvature values within regions C1 and C2 have the crown curvature as a primary curvature target. In regions B1 and B2, twist control is applied to every slider by an amount that does not cause the crown or cross curvatures to go out of region A (i.e., to the right of line 354 or above line 356). In region B1, the initial cross curvature target is static. In region B2, the initial cross curvature target is dynamic. The initial crown and cross curvature targets, $C_{Ini}$ and $X_{Ini}$, are the curvature values to which the incoming crown and cross curvatures are adjusted during the initial curvature adjustment step. For example, these targets may be set to $C_{LL}$ and $X_{LL}$, respectively. From there, the crown and cross curvatures can be adjusted to their final targets, such as the desired nominal or "mean" crown and cross curvatures $C_{MEAN}$ and $X_{MEAN}$, during the final adjustment step.

In region C1, twist control will be applied to every slider by an amount that does not cause crown or cross curvature to go out of region A. The initial crown curvature target can be either static or dynamic. In region C2, twist adjustment will not be applied to any slider in this region unless the magnitude of the incoming twist value, T, is greater then a predetermined critical twist value, $T_{CRITICAL}$, specified by the user. The line 362 separating regions C1 and C2 can therefore be referred to as a twist divider line, and can be controlled by the user.

The final crown and cross curvature bands (shown in FIG. 8) can each have two different lengths, or a range of lengths, depending on whether twist adjustment is performed on a particular slider and the amount and accuracy of the desired curvature changes. If twist adjustment is performed, there is less area on the working surface of the slider to apply the final cross curvature control bands.

a. Curvature Control Process Flow

Figure 16:
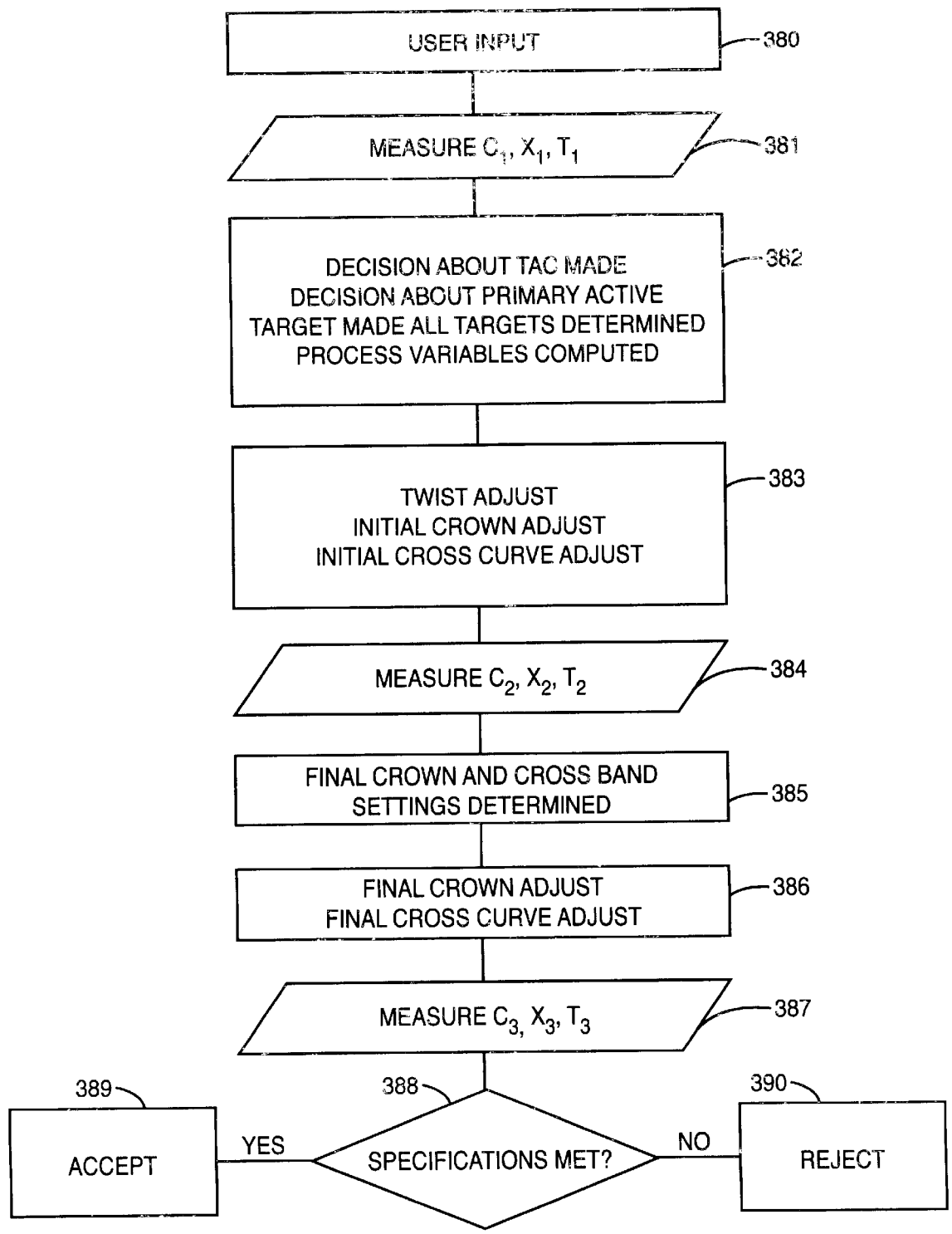
FIG. 16 is a flow chart illustrating a curvature control process flow performed by the apparatus shown in FIG. 4 according to one embodiment of the present invention.

FIG. 16 is a flow chart illustrating a curvature control process flow performed by apparatus 110 according to one embodiment of the present invention. At step 380, the user inputs user-specific data such as the nominal twist, crown and cross curvature values, the twist, crown and cross curvature tolerances, the maximum curvature adjustment band sizes (i.e. maximum number of laser scan lines in each band), the twist critical value, and other parameters.

At step 381, curvature measuring device 111 measures the incoming twist, crown and cross curvature values, $T_1$, $C_1$ and $X_1$, respectively. At step 382, the curvature control algorithm executes a decision matrix in which the algorithm decides whether to apply twist control treatments and whether crown or cross curvature will be the primary target, determines all target values and computes various process variables. Based on the decisions made in step 382, the algorithm controls scanner 116 and light source 112, at step 383, to perform a twist adjustment, such as that shown in FIGS. 4 and 5, and/or initial crown and cross curvature adjustments, such as that shown in FIG. 9, for example.

At step 384, curvature measuring device 111 measures the resulting twist, crown and cross curvatures, $T_2$, $C_2$ and $X_2$, respectively, of the slider being treated. Based on these measurements, the curvature control algorithm determines the final crown and cross curvature adjustment settings, at step 385. The final crown and cross curvature adjustments are then made at step 386. The resulting twist, crown and cross curvatures, $T_3$, $C_3$ and $X_3$, respectively, are again measured at step 387. If these curvatures values are within the predetermined specifications, at step 388, the slider is accepted at step 389. If not, the slider is rejected at step 390.

b. Decision Matrix

Figure 17:
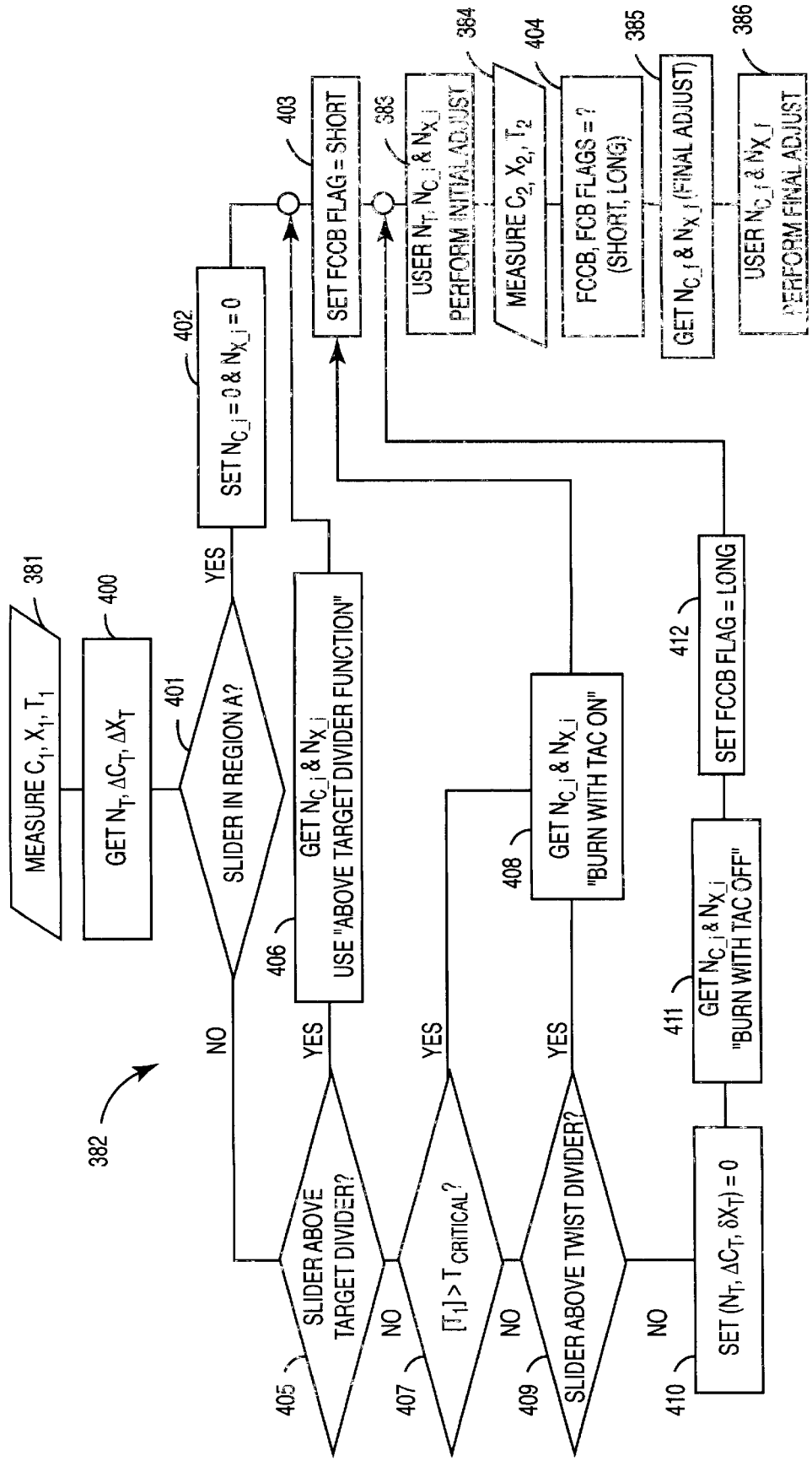
FIG. 17 is a flow chart, which illustrates a decision matrix used in the flow chart of FIG. 16 in greater detail.

FIG. 17 is a flow chart, which illustrates decision matrix 382 in greater detail. The same reference numerals are used in FIG. 17 as were used in FIG. 16 for the same or similar process steps. The values of $C_1$, $X_1$ and $T_1$ are measured at step 381. At step 400, the algorithm determines the number, $N_T$, of laser scan lines that should be placed in the twist adjustment bands based on the incoming twist value $T_1$, and Equation 2 to reach a nominal twist target of zero microinches. Based on the value $N_T$, the algorithm estimates the resulting changes in crown and cross curvature, $\Delta C_T$ and $\Delta X_T$, according to Equations 3 and 4 above.

At step 401, the algorithm checks whether the resulting crown and cross curvature values $C_T$ and $X_T$ are within region A of FIG. 15. If so, the algorithm sets the number of scan lines $N_{C\_i}$ and $N_{X\_i}$ to be applied in the initial crown and cross adjust bands to zero, at step 402. Since the resulting crown and cross curvatures are in region A, no initial crown and cross curvature adjustments are necessary. At step 403, the algorithm sets a final cross curvature band flag FCCB to equal "short". This indicates that the length of the laser scan lines in the final cross adjustment bands will be short rather than long since the twist adjustment step will be consuming part of the working surface of the slider. At step 383, the values of $N_T$, $N_C$ and $N_X$ are used to perform an initial curvature adjustment. The twist, crown and cross curvature values, $T_2$, $C_2$ and $X_2$, are then measured at step 384. At step 404, the algorithm checks to see whether the FCCB and FCB flags are short or long and, based on these flags, determines the number of laser scan lines $N_{C\_f}$ and $N_{X\_f}$ to be applied in the final crown and cross curvature adjustment bands to reach the final curvature targets according to Equations 10 and 11 above, at step 385. These values are then used in step 386 to perform the final curvature adjustments.

Referring back to step 401, if the estimated crown and cross curvature values $C_T$ and $X_T$ resulting from the twist adjustment step are not in region A, the algorithm proceeds to step 405. At step 405, the algorithm determines whether the slider curvature values are above target divider line 360 shown in FIG. 15. If so, cross curvature is the primary target, and the algorithm determines the appropriate number of crown and cross curvature scan lines, $N_{C\_i}$ and $N_{X\_i}$ to be formed in the initial crown and cross curvature adjustment bands using an "Above Target Divider Function," at step 406. This function is described in greater detail below with reference to FIG. 20. If the slider curvature values are below target divider line 360, crown curvature is the primary target, and the algorithm proceeds to step 407.

Figure 22:
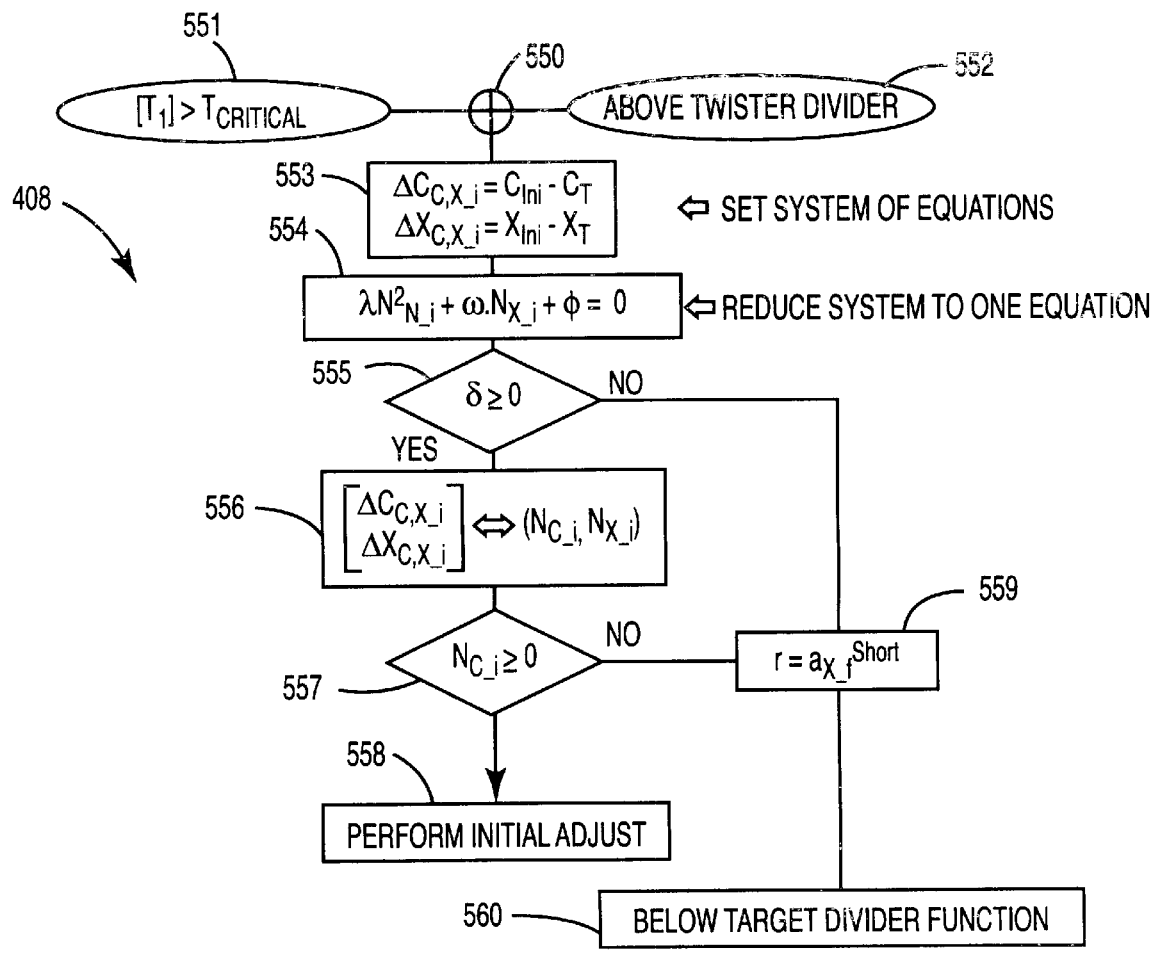
FIG. 22 is a flow chart illustrating the steps to obtain the values of $N_{C\_i}$ and $N_{X\_i}$ when twist adjustment control will be performed.

At step 407, the algorithm determines whether the magnitude of the twist value $T_1$ is greater than the critical twist value $T_{CRITICAL}$. If So, the slider will fail the twist specifications unless a twist adjustment step is performed. Therefore, twist adjustment must be performed and the algorithm proceeds to step 408, where the values of $N_{C\_i}$ and $N_{X\_i}$ are calculated with the assumption that twist control will be preformed. The values of $N_{C\_i}$ and $N_{X\_i}$ are calculated based on a "Burn with TAC (Twist Active Control) ON" function described in more detail below with reference to FIG. 22.

Referring back to step 407, if the incoming twist value is not greater than the critical twist value, the algorithm determines whether the slider's crown and cross curvature values are above the twist divider line 362 shown in FIG. 15, at step 409. If so, the twist adjustment step will be performed, and the algorithm proceeds to step 408 as described above. If not, the algorithm sets $N_T$ equal to zero, at step 410, such that the twist adjustment step will not be performed. As a result, $\Delta C_T$, and $\Delta X_T$ due to twist adjustment will also be zero.

Figure 23:
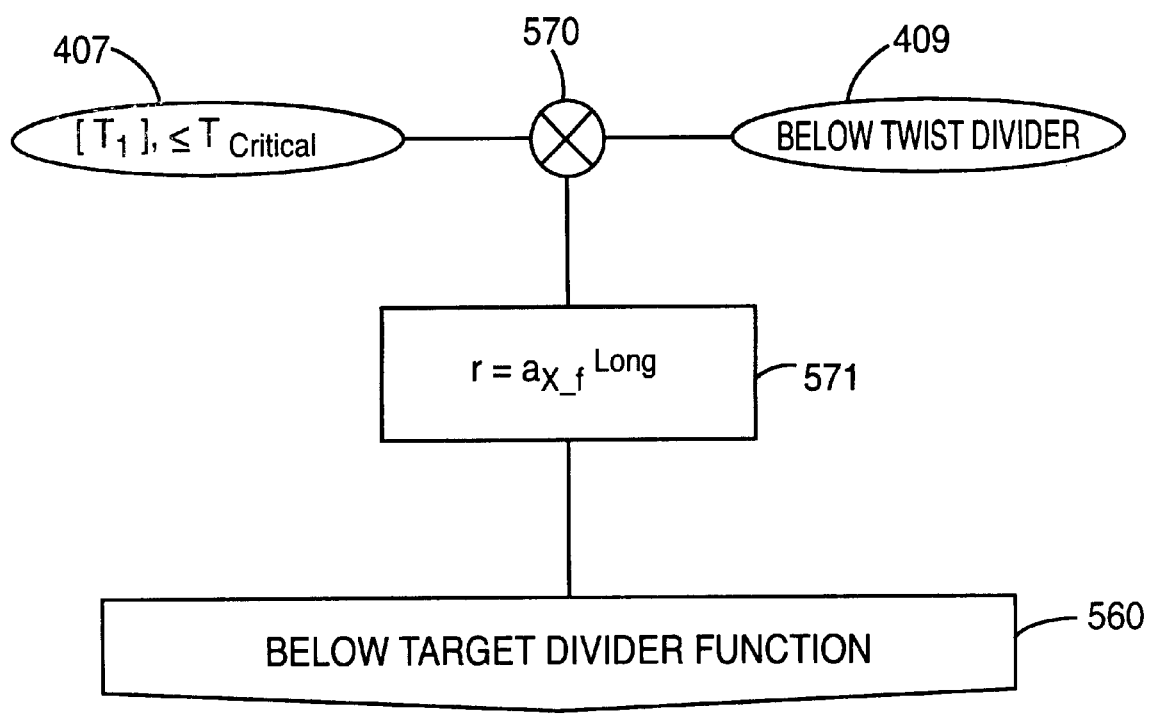
FIG. 23 is a flow chart illustrating the steps to obtain the values of $N_{C\_i}$ and $N_{X\_i}$ when twist adjustment control will not be performed.

At step 411, the algorithm determines the values of $N_{C\_i}$ and $N_{X\_i}$ according to a "Burn with TAC OFF" function, which is described in more detail below with reference to FIG. 23. Since there will be no twist adjustment step, the algorithm sets the final cross curvature band flag FCCB equal to "long", at step 412. The algorithm then proceeds to step 383 to perform the initial curvature adjustment based on the values of $N_T$, $N_{C\_i}$ and $N_{X\_i}$.

c. Solving for $N_T$, $\Delta C_T$ and $\Delta X_T$

Figure 18:
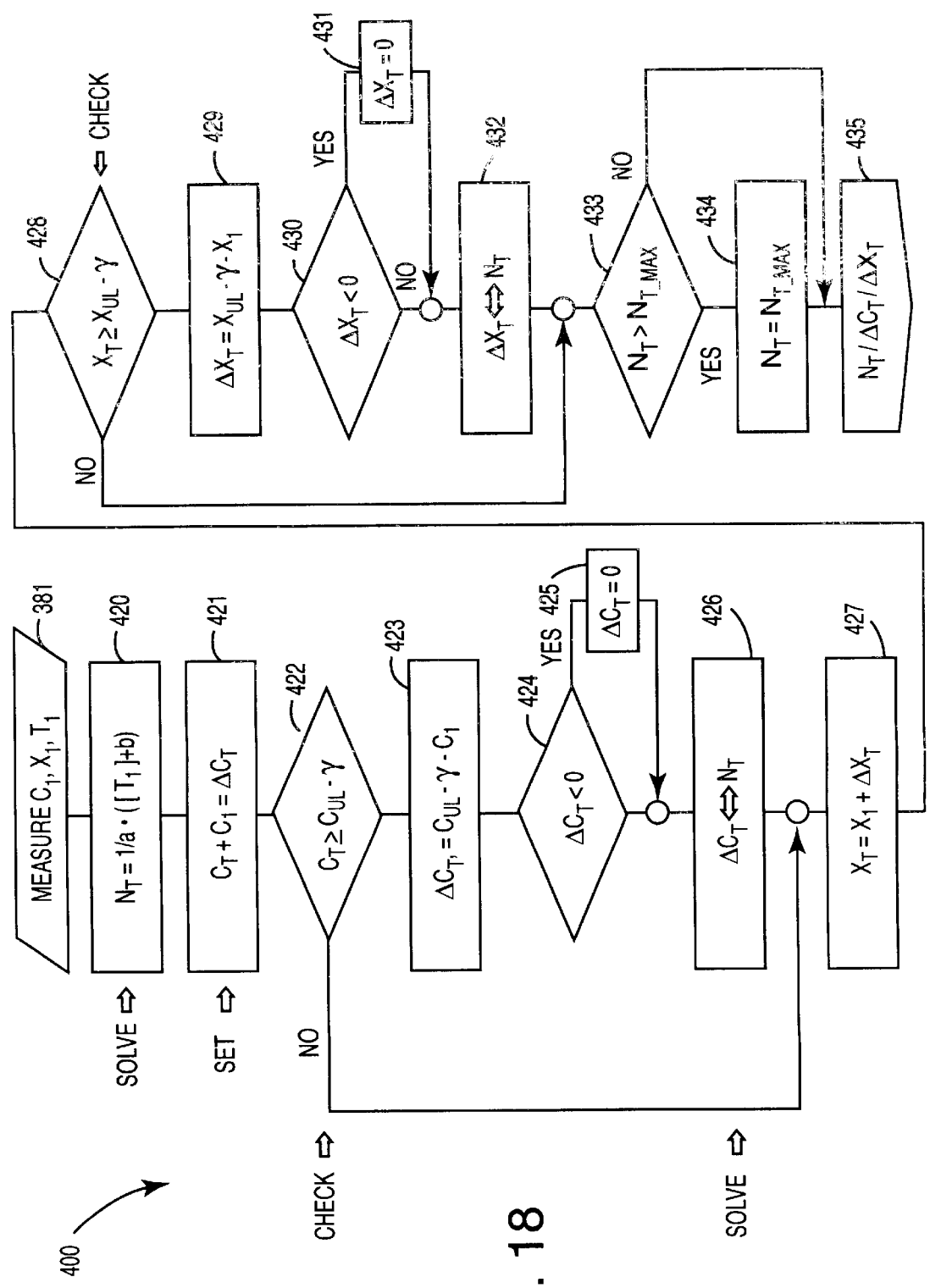
FIG. 18 is a flow chart illustrating the steps performed by the curvature control algorithm while solving for the values of $N_T$, $\Delta C_T$ and $\Delta X_T$ in FIG. 17.

FIG. 18 is a flow chart illustrating the steps performed by the curvature control algorithm while solving for the values of $N_T$, $\Delta C_T$ and $\Delta X_T$, at step 400 in FIG. 17. After the values of $T_1$, $C_1$ and $X_1$ are measured at step 381, the algorithm solves for $N_T$ at step 420 using Equation 2 above. Based on the value of $N_T$, the algorithm estimates the resulting change in crown curvature, $\Delta C_T$, based on Equation 3 above and estimates the resulting crown curvature, $C_T$, based on the incoming crown curvature $C_1$ plus the estimated change in crown curvature $\Delta C_T$, at step 421.

At step 422, the algorithm checks whether the resulting crown curvature $C_T$ has exceeded the upper limit $C_{UL}$ less an overshoot guard factor γ. If not, the algorithm proceeds to step 427. If so, the twist adjustment step will cause the crown curvature to move past region A in FIG. 15. To prevent this, the algorithm sets a desired change in crown curvature $\Delta C_T$ to a value just inside the user's specification based on the incoming curvature $C_1$ and the guard factor $\gamma$, at step 423. If the change in crown curvature would be negative, at step 424, the algorithm sets the desired change to zero, at step 425 and proceeds to step 426. At step 426, a new, reduced value of $N_T$ is determined based on the desired change in crown curvature $\Delta C_T$, according Equation 3 above.

The algorithm then performs a similar check on the resulting cross curvature $X_T$. At step 427, the resulting cross curvature $X_T$ is estimated based on the incoming cross curvature $X_1$ and the estimated change in cross curvature $\Delta X_T$ based on Equation 4 above. At step 428, the algorithm checks whether the resulting cross curvature $X_T$ exceeds the cross curvature upper limit $X_{UL}$ less the overshoot guard factor $\gamma$. If not, the algorithm proceeds to step 433. If so, the algorithm sets the desired change in cross curvature $\Delta X_T$ to be the upper limit $X_{UL}$ minus the incoming cross curvature $X_1$ minus the overshoot guard factory, at step 429. If the new value of $\Delta X_T$ is less than zero, at step 430, the algorithm sets $\Delta X_T$ to equal zero at step 431 and proceeds to step 432. A new, reduced value of $N_T$ is then calculated at step 432 based on the new value of $\Delta X_T$ and Equation 4 above. At step 433, the algorithm checks whether the value of $N_T$ is greater than a predetermined maximum number of lines $N_{T\_MAX}$ that can be applied within the twist adjustment bands, at step 434. If so, the algorithm sets $N_T$ to equal the maximum number $N_{T\_MAX}$, at step 433 and proceeds to step 435. If not, the algorithm proceeds directly from step 433 to step 435, where the values of $N_T$, $\Delta C_T$ and $\Delta X_T$ are passed to the next step in the decision matrix shown in FIG. 17.

d. Slider Location in Capability Window

Figure 19B:
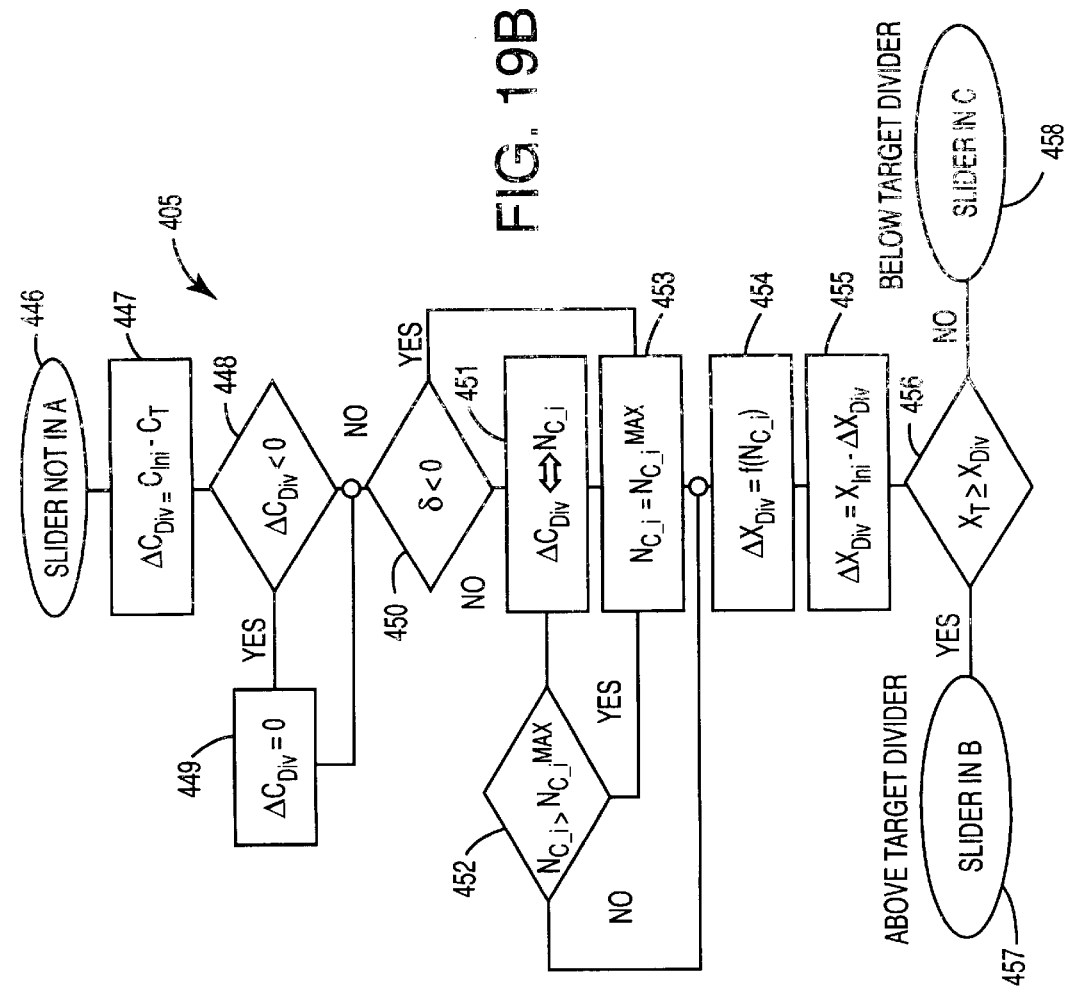
FIGS. 19A and 19B show steps performed in the flow chart of FIG. 17 to determine whether the curvature values following a twist adjustment step will be in regions "A", "B" or "C" in FIG. 15.
Figure 19A:
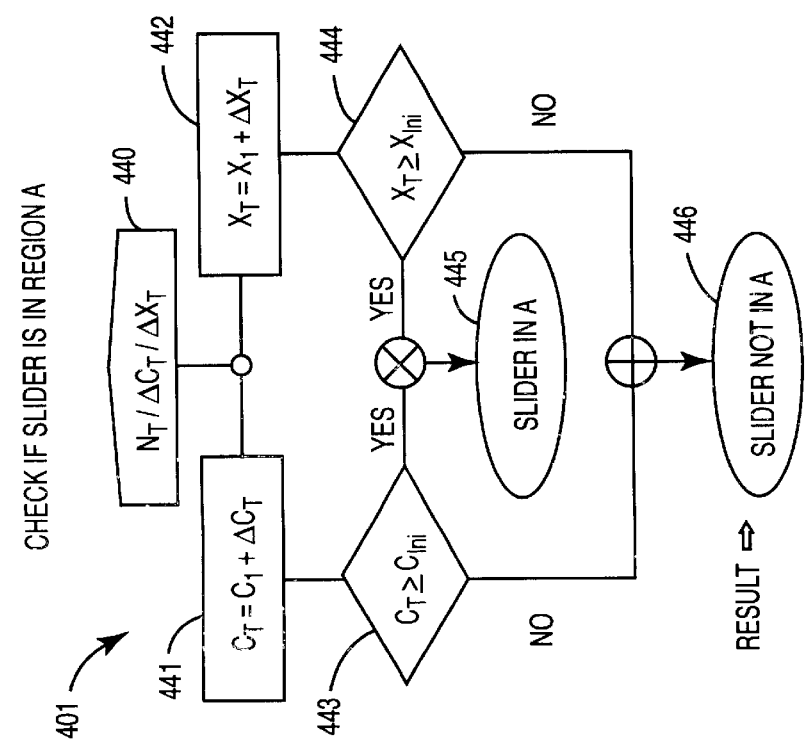

FIG. 19A shows the steps performed within decision box 401 of FIG. 17 to determine whether the curvature values following the twist adjustment step will be in region A. At step 440, the values of $N_T$, $\Delta C_T$ and $\Delta X_T$ are received from step 400 in FIG. 17. From these values, estimates of $C_T$ and $X_T$ are calculated at steps 441 and 442, respectively.

The algorithm then compares $C_T$ and $X_T$ to the initial targets $C_{Ini}$ and $X_{Ini}$ (e.g. $C_{LL}$ and $X_{LL}$), at steps 443 and 444. If both $C_T$ and $X_T$ are greater than or equal to the initial target values, the algorithm determines that the slider is in region A, at step 445. If either of these values are less than their initial targets, the algorithm determines that the slider is not in region A, at step 446.

FIG. 19B shows the steps performed in decision box 405 in FIG. 17 to determine whether the curvature values are within region B or C (above or below target divider line 360). At step 446, the slider is assumed not to be in region A. In one embodiment, line 360 is defined such that for any given slider on line 360, the number of laser scan lines placed within the initial crown curvature adjustment band to shift the crown curvature $C_T$ to the initial crown curvature target $C_{Ini}$ will also result in the cross curvature $X_T$ shifting to its initial target $X_{Ini}$. Given the change, $\Delta C_{DIV}$, needed to shift the crown curvature to its initial target $C_{Ini}$, the algorithm determines the change $\Delta X_{DIV}$ that is needed for the cross curvature to reach its initial target $X_{Ini}$. For any given $\Delta C_{DIV}$, the corresponding cross curvature $X_{DIV}$ on line 360 can be determined. The algorithm can then determine whether a given slider is above or below line 360 by determining whether the cross curvature is greater than or less than the cross curvature value $X_{DIV}$ at the divider line.

These calculations are accomplished by the following steps. At step 447, the algorithm determines the change $\Delta C_{DIV}$ needed to shift the crown curvature $C_T$ (resulting from the twist adjustment step) to the initial target $C_{Ini}$. At step 448, the algorithm checks whether $\Delta C_{DIV}$ is less than zero. If so, $\Delta C_{DIV}$ is set to zero at step 449 and the algorithm proceeds to step 450. Before solving for $N_{Ini}$ based on the crown curvature change $\Delta C_{DIV}$ needed to reach the initial target, the algorithm checks to see whether the solution for $N_{C\_i}$ will be complex based on the following equation:

$$\delta f_{C\_i}^2 + 4 \cdot e_{C\_i} \cdot \Delta C_{DIV} \qquad \text{Eq.12}$$

If $\delta$ is less than zero, the solution for $N_{C\_i}$ will be complex, and the algorithm sets $N_{C\_i}$ to equal the maximum number of lines $N_{C\_i}^{MAX}$ that can be formed in the initial crown curvature adjustment band, at step 453. If 6 is not negative, a solution for $N_{C\_i}$ exists and the algorithm solves for $N_{C\_i}$ at step 451 given the value of $\Delta C_{DIV}$ based on the following equation:

$$\Delta C_{DIV} = e_{C\_i} \cdot N_{\_i}^2 + f_{C\_i} \cdot N_{C\_i} \qquad \text{Eq.13}$$

If $N_{C\_i}$ is greater than the maximum number of lines $N_{C\_i}^{MAX}$, at step 452, the algorithm reduces the value of $N_{C\_i}$ to the maximum value $N_{C\_i}^{MAX}$, at step 453. If not, the value of $N_{C\_i}$ is passed to step 454, where the algorithm calculates the change in cross curvature $\Delta X_{DIV}$ given the value of $N_{C\_i}$ by, $$\Delta X_{DIV} = g_{C\_i} \cdot N_{C\_i}^2 + h_{C\_i} \cdot N_{C\_i} \qquad \text{Eq.14}$$

Then, the corresponding cross curvature $X_{DIV}$ on target divider line 360 is calculated based on the initial cross curvature target $X_{Ini}$ and the change in cross curvature $\Delta X_{DIV}$ given the value of $N_{C\_i}$, at step 455.

The estimated cross curvature value $X_T$ resulting from the twist adjustment step can then be compared to the cross curvature value $X_{DIV}$ on target divider line 360 at step 456. If $X_T$ is greater than or equal to the value of $X_{DIV}$, the slider is above the target divider line 360, at step 457. If not, the slider is below target divider line 360, at step 458.

e. Above Target Divider Function

Figure 20:
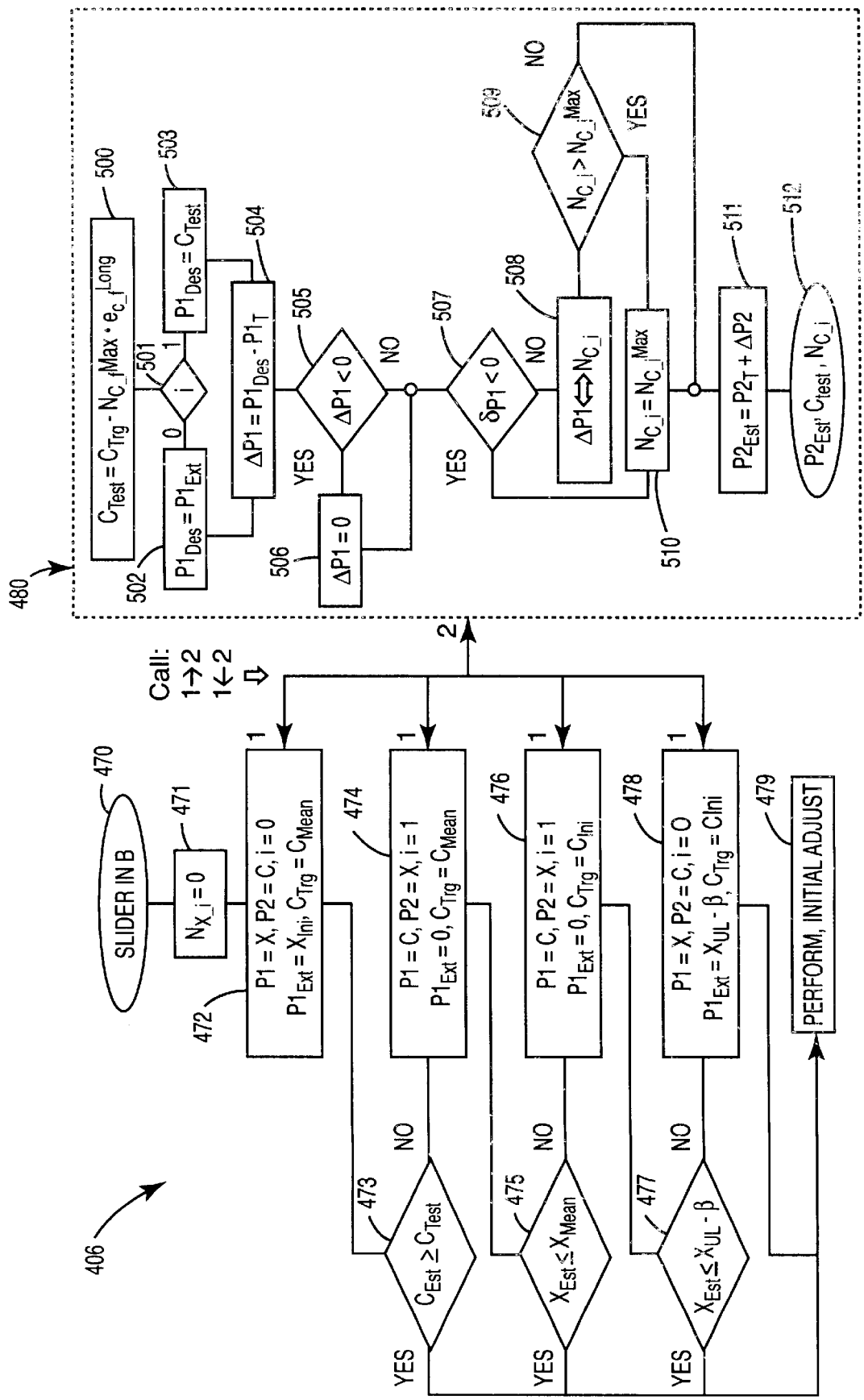
FIG. 20 is a flow chart illustrating an Above Target Divider Function used to determine the values of $N_{C\_i}$ and $N_{X\_i}$ for performing an initial curvature adjustment step.

The above target divider function of step 406 in FIG. 17 is shown in greater detail in FIG. 20. Above target divider function 406 determines the values of $N_{C\_i}$ and $N_{X\_i}$ to be used during the initial curvature adjustment step so that the resulting crown and cross curvatures can be adjusted later during the final curvature adjustment step to reach the nominal or "mean" values without exceeding their upper limits $C_{UL}$ and $X_{UL}$, less overshoot guard factors.

The above target divider function includes step 470–479. At step 470, the slider is assumed to be within region B1 or B2, above the target divider line 360. Since the slider is above target divider line 360, the cross curvature is the primary active target. From the definition used to identify target divider line 360, the number of laser scan lines $N_{C\_i}$ placed in the initial crown adjust band to shift $C_T$ to its initial target $C_{Ini}$ will be enough to cause the cross curvature to meet or exceed its initial target value $X_{Ini}$. Therefore, no laser scan lines need to be placed in the initial cross curvature ajustment bands, and $N_{X\_i}$ is set to zero at step 471.

Steps 472, 474, 476 and 478 each pass a set of respective parameters to a common subroutine 480. Based on these parameters, subroutine 480 passes back a plurality of the result parameters, including a curvature estimate parameter $P2_{EST}$, a test crown curvature value $C_{TEST}$ and a corresponding value for $N_{C\_i}$. These parameters are then tested at steps 473, 475 and 477 before the value of $N_{C\_i}$ is used to perform the initial curvature adjustment, at step 479. The test crown curvature value $C_{TEST}$ represents the minimum crown curvature (following the initial curvature adjustment step) from which the final curvature adjustment step will be capable of shifting to the final crown target.

At step 472, the parameter P1 is set to represent cross curvature, X, the parameter P2 is set to represent crown curvature, C, an index "i" is set to zero, an external parameter $P1_{EXT}$ is set to the initial cross curvature target $X_{Ini}$, and a final crown curvature target parameter $C_{TRG}$ is set to the nominal, or "mean" curvature $C_{MEAN}$. Within subroutine 480, the curvature control algorithm determines the test crown curvature value $C_{TEST}$, at step 500, based on the final crown curvature target $C_{TRG}$, the maximum number $N_{C\_f}^{MAX}$ of laser scan lines that can be placed in the final crown curvature adjustment bands and the final crown curvature response constant $e_{C\_f}^{LONG}$ for long laser scan lines. The value of $C_{TEST}$ therefore represents the minimum crown curvature following the initial adjustment step at which the final adjustment step can shift (with the maximum number of laser scan lines) to reach the final crown target, $C_{MEAN}$.

At step 501, since index "i" is equal to zero, the algorithm proceeds to step 502 where the algorithm sets the desired cross curvature $P1_{DES}$ (i.e. $X_{DES}$) from the initial adjustment step to equal the external parameter $P1_{EXT}$ (i.e. $X_{Ini}$). The curvature change $\Delta P1$ (i.e. $\Delta X_{C\_i}$) that is needed to reach the desired cross curvature $P1_{DES}$ ($X_{Ini}$) is then calculated at step 504 based on the cross curvature $P1_T$ ($X_T$) following the twist adjustment step. If the curvature change $\Delta P1$ ($\Delta X_{C\_i}$) is less than zero, at step 505, it is set to zero at step 506. Based on the needed curvature change $\Delta P1$ ($\Delta X_{C\_i}$), the values of $N_{C\_i}$ and $P2_{EST}(C_{EST})$ can be calculated.

At step 507, the algorithm checks whether the solution to the equation, $$\Delta X_{C\_i} = g_{C\_i} \cdot N_{C\_i}^2 + h_{C\_i} \cdot N_{C\_i} \qquad \text{Eq.15}$$

is complex based on the equation, $$\delta_{P1}(\delta_X) = h_{C\_i}^2 + 4 \cdot g_{C\_i} \cdot \Delta X_{C\_i} \qquad \text{Eq.16}$$

Since $g_{C\_i}$ is positive, the above equation is always positive, the solution to equation 15 will not be complex and can be solved for $N_{C\_i}$ based on the value of $\Delta P1$ ($\Delta X_{C\_i}$), at step 508. If the solution were complex, the algorithm would proceed to step 510 and set $N_{C\_i}$ equal to the maximum number of scan lines $N_{C\_i}^{MAX}$ that can be placed in the initial crown adjustment band. At step 509, the algorithm checks whether the number $N_{C\_i}$ is greater than the maximum number of lines $N_{C\_i}^{MAX}$. If so, the algorithm sets $N_{C\_i}$ equal to $N_{C\_i}^{MAX}$ at step 510. If not, the algorithm proceeds directly to step 511 where it estimates the resulting crown curvature $P2_{EST}$ ($C_{EST}$) following the initial adjustment step given the curvature $P2_T(C_T)$ following the twist adjustment step and the change in curvature $\Delta P2$ ($\Delta C_{C\_i}$) given the value of $N_{C\_i}$. $\Delta Cc_{\_i}$ is calculated based on the equation, $$\Delta C_{C\_i} = e_{C\_i} \cdot N_{C\_i}^2 + f_{C\_i} \cdot N_{C\_i} \qquad \text{Eq.17}$$

The values of $P2_{EST}$ ($C_{EST}$), $C_{TEST}$ and $N_{C\_i}$ are then passed back to calling step 472, at step 512. At step 473, the algorithm checks whether the estimated crown curvature $C_{EST}$ equals or exceeds the minimum test value $C_{TEST}$ needed for the final curvature adjustment step. If so, the algorithm proceeds directly to step 479 for performing the initial curvature adjustment with the present value of $N_{C\_i}$. If not, the algorithm proceeds to calling step 474 where a new set of parameters are passed to subroutine 480.

In calling step 474, the parameters are changed in order to estimate the cross curvature $\Delta X_{C\_i}$ following the initial curvature adjustment step. Parameter P1 is set to equal crown curvature, C, parameter P2 is set to equal cross curvature, X, and index "i" is set to one. The final crown target remains at $C_{MEAN}$. In subroutine 480, $C_{TEST}$ remains the same as the previous call to the subroutine. Since i=1, the algorithm proceeds to step 503, where the parameter $P1_{DES}$ is set to equal $C_{TEST}$. In other words, the resulting crown curvature will be at least $C_{TEST}$ such that the final adjustment step is capable of reaching $C_{MEAN}$. The change in crown curvature $\Delta P1$ ($\Delta C_{C\_i}$) required to reach $P1_{DES}(C_{TEST})$ during the initial adjustment step is calculated at step 504. If this value is less than zero, at step 505, it is set to zero at step 506. At step 507, the algorithm checks whether the solution to the equation, $$\Delta C_{C\_i} = e_{C\_i} \cdot N_{C\_i}^2 + f_{C\_i} \cdot N_{C\_i} \qquad \text{Eq.18}$$

is complex according to the equation, $$\delta_C = f_{C\_i}^2 + 4 \cdot e_{C\_i} \qquad \text{Eq.19}$$

which can be negative depending on the sign and value of $e_{C\_i}$. If the solution is complex, the algorithm sets $N_{C\_i}$ equal to $N_{C\_i}^{MAX}$, at step 510. If not, the algorithm solves equation 18 for $N_{C\_i}$ given the value of $\Delta P1$ ($\Delta C_{C\_i}$). If the solved value of $N_{C\_i}$ is greater than $N_{C\_i}^{MAX}$, at step 509, the maximum value is used, at step 510. Given the present value of $N_{C\_i}$, the resulting cross curvature $P2_{EST}$ ($X_{EST}$) is estimated at step 511 based on equation 15 given above. The values of $P2_{EST}(X_{EST})$, $C_{TEST}$ and $N_{C\_i}$ are then passed back to calling step 474.

At step 475, the estimated cross curvature $X_{EST}$ is compared to the mean value $X_{MEAN}$. If $X_{EST}$ does not exceed $X_{MEAN}$, then the algorithm proceeds to step 479 to perform the initial adjustment step given the values of $N_{X\_i}$ and $N_{C\_i}$. If $X_{EST}$ exceeds $X_{MEAN}$, the cross curvature $X_{C\_i}$ was moved beyond the final target value $X_{MEAN}$, and the final curvature adjustment step would not be able to adjust the cross curvature back downward. To prevent this, the value of $C_{TEST}$ is relaxed by reducing crown target $C_{TRG}$ from $C_{MEAN}$ to the initial target $C_{Ini}$, in calling step 476, so that $X_{EST}$ will not exceed $X_{MEAN}$. The values of $P2_{EST}$ ($X_{EST}$), $C_{TEST}$ and $N_{C\_i}$ are then re-calculated by subroutine 480 based on the new value of $C_{TRG}$.

The new value of $X_{EST}$ is then checked to see whether it lies within region A by checking whether $X_{EST}$ is less than or equal to the upper cross curvature limit $X_{UL}$ (less an overshoot safety factor $\beta$). If so, the algorithm proceeds to step 479 for performing the initial adjustment step using $N_{X\_i}$ and new value of $N_{C\_i}$. If not, the change in cross curvature $\Delta X_{C\_i}$ is redefined so that the resulting cross curvature $X_2$ remains within region A. At step 478, similar parameters are used as were used in step 472, but $P1_{EXT}$ (the desired cross curvature) is now set to $X_{UL}$-$\beta$, and the crown target parameter is set to $C_{Ini}$. In subroutine 480, the change in cross curvature $\Delta P1$ ($\Delta X_{C\_i}$) needed to reach the desired curvature $P1_{DES}$ ($X_{UL}$-$\beta$) is calculated at step 504. The number of scan lines $N_{C\_i}$ needed to create the curvature change $\Delta P1$ ($\Delta X_{C\_i}$) is then re-calculated at step 508. The new value of $N_{C\_i}$ is then passed back to calling step 478 as discussed above. This value is then used during the initial curvature adjustment at step 479.

Returning to the decision matrix shown in FIG. 17, the values of $N_{C\_i}$ and $N_{X\_i}$ are then passed from step 406 to step 383.

f. Location of Slider Relative to Twist Divider

Figure 21:
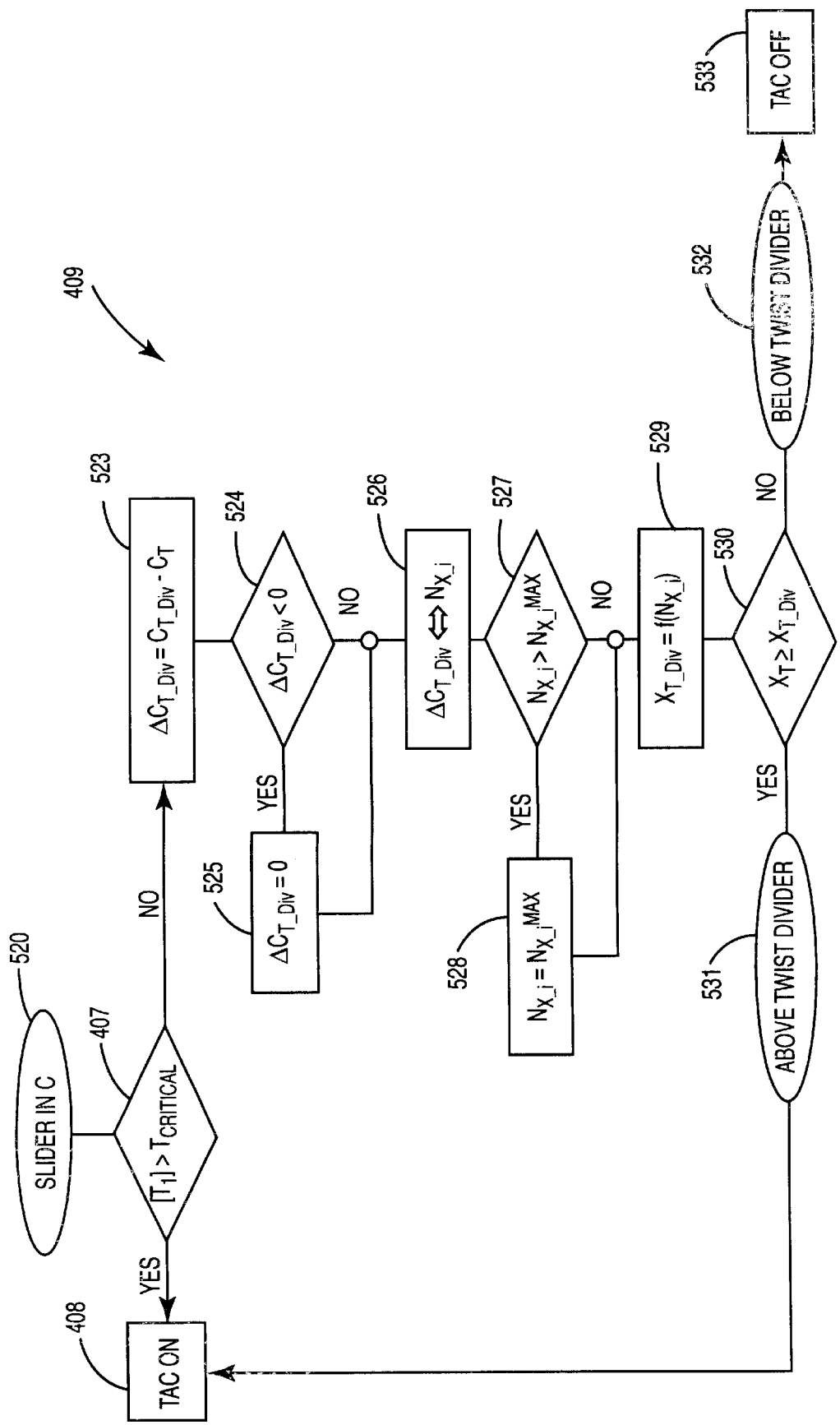
FIG. 21 is a flow chart illustrating the steps performed by the curvature control algorithm to determine whether the crown and cross curvatures of the slider are above or below a twist divider line shown in FIG. 15.

FIG. 21 is a flow chart illustrating the steps performed by the curvature control algorithm to determine whether the crown and cross curvatures of the slider are above or below twist divider line 362, shown in FIG. 15, within step 409 in the decision matrix of FIG. 17.

When the magnitude of the incoming twist value $T_1$ is less than or equal to the critical twist value $T_{CRITICAL}$, the decision of applying twist control is based on the need to allocate more space, and hence more response, for cross curvature in the final adjustment step. Twist divider line 362 separates area C1, in which twist control is performed, and area C2, in which twist control is not performed.

At step 520, the slider is assumed to be in region C1 or C2 coming out of step 405 in FIG. 17. As discussed above, if the magnitude of the incoming twist value is greater than the critical value, at step 405, the algorithm proceeds to step 408 where the values of $N_{C\_i}$ and $N_{X\_i}$ are calculated based on the assumption that twist control will be performed. If the magnitude of the incoming twist value is not greater than the critical value, the algorithm proceeds to step 523 to determine whether the slider is above or below twist divider line 362 in FIG. 15.

At step 523, the location of the twist divider line is set by a user-define variable $C_{T\_DIV}$. The higher the value of $C_{T\_DIV}$, the lower the twist divider line 362. In one embodiment, $C_{T\_DIV}$ is set by the user to equal $C_{MEAN}$. In defining line 362, the algorithm determines the amount of change $\Delta C_{T\_DIV}$ required to adjust the crown curvature $C_T$ (that would exist following a twist adjustment step) to the value of $C_{T\_DIV}$. If the change is less than zero, at step 524, it is set to zero at step 525. At step 526, the number of laser scan lines $N_{X\_i}$ that are needed to be formed in the initial cross curvature adjustment bands in order to achieve the crown curvature change $\Delta C_{T\_DIV}$ is calculated based on the equation, $$\Delta C_{T\_DIV} = C_{X\_i} N_{X\_i}^2 + d_{X\_i} N_{X\_i} \qquad \text{Eq.20}$$

If the number $N_{X\_i}$ is greater than the maximum number $N_{X\_i}^{MAX}$ that can be formed in the initial cross curvature adjustment bands, at step 527, then $N_{X\_i}$ is set to the maximum number at step 528. At step 529, a corresponding cross curvature value $X_{T\_DIV}$ on twist divider line 362 is calculated as a function of the number of scan lines $N_{X\_i}$ according to the equation, $$X_{T\_DIV} = X_{Ini} - \frac{2}{3} \cdot N_{X\_f}^{MAX} \cdot a_{X\_f}^{SHORT} - N_{X\_i} \cdot a_{X\_i} \qquad \text{Eq. 21}$$

The value of $X_{T\_DIV}$ represents a cross curvature value following a twist adjustment step that lies on the twist divider line defined by $C_{T\_DIV}$. The estimated incoming cross curvature, $X_T$, following the twist adjustment step is then compared to the cross curvature $X_{T\_DIV}$ on twist divider line 362, at step 530. If $X_T$ is greater than or equal to $X_{T\_DIV}$, the incoming cross curvature is above twist divider line 362, as noted at 531, and the algorithm proceeds to step 408 to calculate the values of $N_{C\_i}$ and $N_{X\_i}$ assuming that the twist adjustment step will be performed. If $X_T$ is less than $X_{T\_DIV}$, the slider is below twist divider line 362, as noted at 532 and twist adjustment is turned off at step 533.

g. Burn With Twist Active Control (TAC) ON

Referring back to FIG. 17, at step 408, the values of $N_{C\_i}$ and $N_{X\_i}$ are obtained with the assumption that twist active control will be performed. Step 408 is shown in greater detail in FIG. 22. With logic-OR function 550, step 408 is performed if the incoming twist magnitude is greater than the critical twist value, at step 551 or the slider curvature values are above twist divider 362 in FIG. 15, at step 552. At step 553, the following system of equations define the required change in crown and cross curvatures to reach their initial targets $C_{Ini}$ and $X_{Ini}$, $$\Delta C_{C,X\_i} = C_{Ini} - C_T \qquad \text{Eq.22}$$

$$\Delta X_{C,X\_Ini} = X_{Ini} - X_T \qquad \text{Eq.23}$$

where $\Delta C_{C,X\_i}$ and $\Delta X_{C,X\_i}$ are the changes in crown and cross curvature that would result from laser scan lines placed in both the initial crown and cross curvature bands. The curvature responses for $\Delta C_{C,X\_i}$ and $\Delta X_{C\_i}$ are defined by, $$\Delta C_{C,X\_i} = c_{X\_i} N_{X\_i}^2 + d_{X\_i} N_{X\_i} + e_{C\_i} N_{C\_i}^2 + f_{C\_i} N_{C\_i} \qquad \text{Eq.24}$$

$$\Delta X_{C,X\_i} = a_{X\_i} N_{X\_i} + b_{C\_i} N_{C\_i} \qquad \text{Eq.25}$$

Equations 22–25 can be reduced to one equation at step 554, $$\lambda \cdot N_{X\_i}^2 + \omega \cdot N_{X\_i} + \varpi = 0 \qquad \text{Eq.26}$$

where:

$$\lambda = c_{X\_i} + e_{C\_i} \cdot \left(\frac{a_{X\_i}}{b_{C\_i}}\right)^2 \qquad \text{Eq. 27}$$

$$\omega = d_{X\_i} - \left(\frac{a_{X\_i}}{b_{C\_i}}\right) \cdot \left(\frac{2e_{C\_i}}{b_{C\_i}} \Delta X_{C,X\_i} + f_{C\_i}\right) \qquad \text{Eq. 28}$$

$$\phi = e_{C\_i} \left(\frac{\Delta X_{C,X\_i}}{b_{C\_i}}\right)^2 + \frac{f_{C\_i}}{b_{C\_i}} \Delta X_{C,X\_i} - \Delta C_{C,X\_i} \qquad \text{Eq. 29}$$

At step 555, the algorithm checks to see whether the solution to equation 26 is complex by checking whether the following equation is greater than or less than zero:

$$\delta = \omega^2 - 4\lambda\phi \qquad \text{Eq.30}$$

If $\delta$ is greater than or equal to zero, at step 555, then the above system of equations can be solved for $N_{C\_i}$ and $N_{X\_i}$ to provide the following equations, $$N_{X\_i} = \frac{-\omega - \sqrt{\delta}}{2\lambda} \qquad \text{Eq. 31}$$

$$N_{C\_i} = \frac{\Delta X_{C,X\_i} - a_{X\_i} N_{X\_i}}{b_{C\_i}} \qquad \text{Eq. 32}$$

Equations 31 and 32 can then be used to obtain values for $N_{C\_i}$ and $N_{X\_i}$, at step 556. At step 557, as long as the number $N_{C\_i}$ is greater than or equal to zero, the algorithm proceeds to step 558 for performing the initial curvature adjustment step with the values obtained for $N_{C\_i}$ and $N_{X\_i}$. If $N_{C\_i}$ is less than zero at step 557 or if $\delta$ is less than zero at step 555, the algorithm proceeds to step 559 and sets a variable "r" equal to the constant $a_{X\_f}^{SHORT}$, which is the constant used in the final cross curvature response equation for "short" laser scan lines that are used when twist adjustment is performed. The algorithm then proceeds to step 560 to solve for $N_{C\_i}$ and $N_{X\_i}$ differently, according to a "below target divider function." The below target divider function is discussed below with reference to FIG. 24.

h. Burn With Twist Adjust Control Off

Referring back to FIG. 17, if twist adjustment will not be performed, the values of $N_{C\_i}$ and $N_{X\_i}$ are obtained at step 411. Step 411 is shown in greater detail in FIG. 23. At step 570, the logic-AND function indicates that there will be no twist adjustment performed if the magnitude of the incoming twist value is less than or equal to the critical twist value, at step 407, and the incoming crown and cross curvature values are below twist divider line 362 shown in FIG. 15. Since there will be no twist adjustment, the final cross curvature adjustment bands can be formed with longer laser scan lines, and at step 571 the algorithm sets the variable "r" equal to the constant $a_{X\_f}^{LONG}$, which is the constant used in the final cross curvature response equation when the laser scan lines placed in the final cross curvature adjustment bands are long. The variable "r" is then passed to the below target divider function 560, where the values of $N_{C\_i}$ and $N_{X\_i}$ are calculated.

i. Below Target Divider Function

Figure 24:
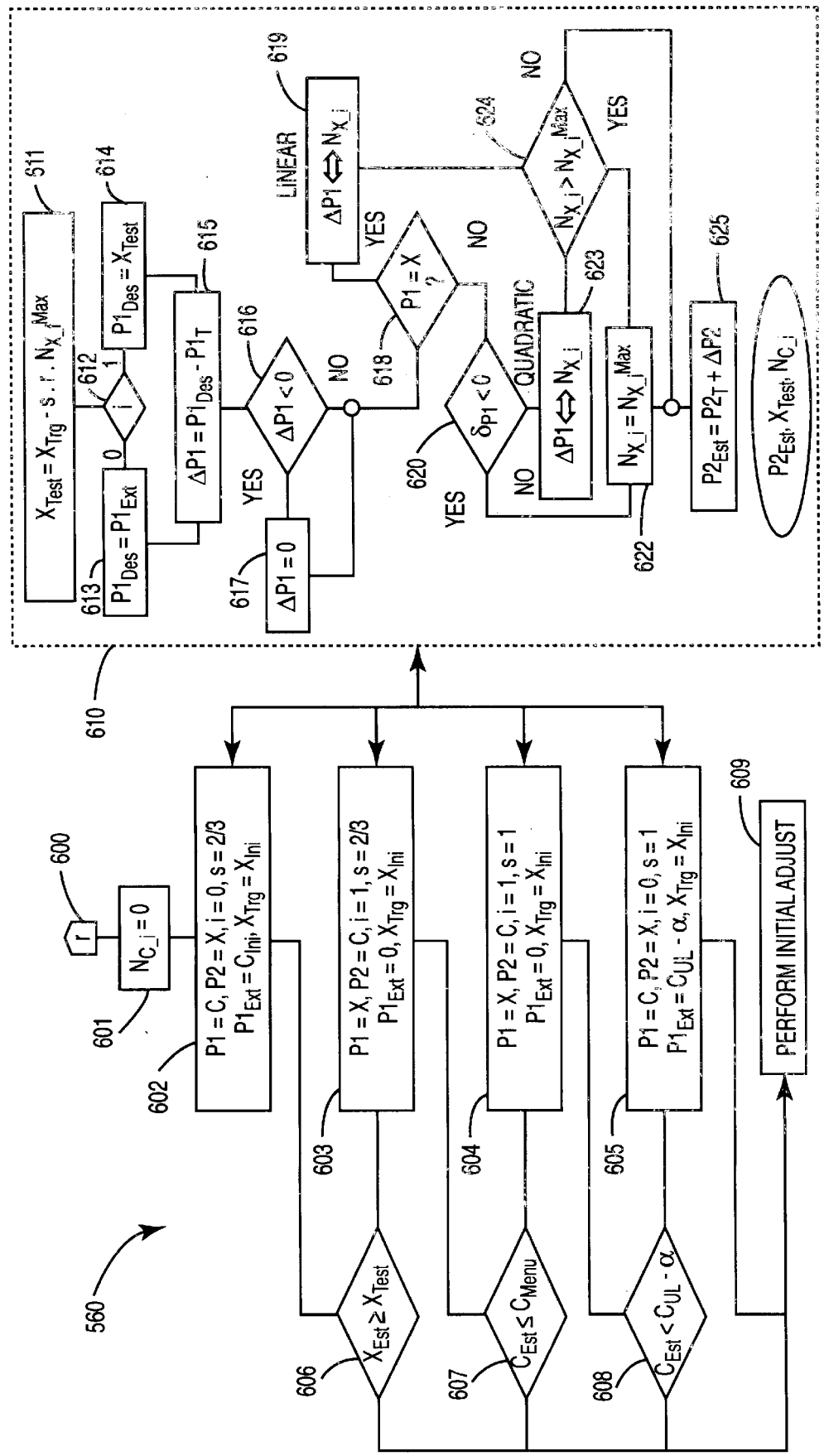
FIG. 24 illustrates the steps performed by a Below Target Divider Function used to determine the values of $N_{C\_i}$ and $N_{X\_i}$ for performing the initial curvature adjustment step.

FIG. 24 illustrates the steps performed in below target divider function 560. The below target divider function 560 is called from step 411 (shown in FIG. 17) when twist adjustment control is "off" or from step 408 (also shown in FIG. 17) when twist adjustment control is "on", when the solution for $N_{C\_i}$ and $N_{X\_i}$ was complex or the value of $N_{C\_i}$ was negative. The respective value of "r", either $a_{X\_f}^{SHORT}$ or $a_{X\_f}^{LONG}$, is received from the calling function at step 600. At step 601, $N_{C\_i}$ is set to zero since it is assumed that the crown value $C_T$ is large enough relative to $X_T$ that an initial crown adjustment step is not needed.

Similar to the "Above Target Divider Function," steps 602–605 each pass a set of respective parameters to subroutine 610 for which subroutine 610 generates a curvature estimate $P2_{EST}$ (either $C_{EST}$ or $X_{EST}$), a test cross curvature value $X_{TEST}$ and a corresponding value for $N_{X\_i}$. These values are then tested against predetermined criteria in steps 606–608 before the values of $N_{C\_i}$ and $N_{X\_i}$ are used to perform the initial curvature adjustment at step 609.

At step 602, parameter "P1" is set to represent crown curvature, C, the parameter "P2" is set to represent cross curvature, X, and an index "i" is set to zero. A skew factor "s" is set to 2/3, which has an affect on distribution of cross curvature responses in the final cross curvature adjustment step. An external parameter "$P1_{EXT}$" is set to equal the initial crown curvature target $C_{Ini}$, while the cross curvature target parameter $X_{TRG}$ is set to equal the initial cross curvature target $X_{Ini}$.

In subroutine 610, a test cross curvature value $X_{TEST}$ is calculated, at step 611, based on the cross curvature target parameter $X_{TRG}$ and the cross curvature response to the maximum number $N_{X\_f}^{MAX}$ of lines that can be placed in the final cross curvature band, which is multiplied by the skew factor s. Note that the variable "r" reflects the appropriate constant $a_{X\_i}^{SHORT}$ or $a_{X\_i}^{LONG}$, which is passed to subroutine 610. The cross curvature test value $X_{TEST}$ represents the minimum cross curvature value that can be adjusted in the final adjustment step to reach the cross curvature target $X_{TRG}$ ($X_{Ini}$) for a value of s=1.

At step 612, since the index "i" is equal to zero, the algorithm proceeds to step 613 where a desired crown curvature parameter $P1_{DES}$ ($C_{DES}$) is set to the external parameter $P1_{EXT}$ ($C_{Ini}$). The necessary curvature change $\Delta P1$ ($\Delta C_{X\_i}$) needed to reach $P1_{DES}$ ($C_{Ini}$) is calculated in step 615. If the needed curvature change $\Delta P1$ ($\Delta C_{X\_i}$) is less than zero, at step 616, it is set to zero at step 617. At step 618, since the parameter P1 equals crown curvature, C, not cross curvature, X, the change in curvature $\Delta P1$ ($\Delta C_{X\_i}$) follows the following quadratic equation, $$\Delta P1(\Delta C_{X\_i}) = c_{X\_i} \cdot N_{X\_i}^2 + d_{X\_i} \cdot N_{X\_i} \qquad \text{Eq.33}$$

and the algorithm proceeds to step 620. The following equation indicates whether the above equation has a complex solution, $$\delta_C = d_{X\_i}^2 + 4 \cdot c_{X\_i} \cdot \Delta C_{X\_i} \qquad \text{Eq.34}$$

If $\delta_C$ is less than zero, at step 620, then the solution will be complex and the value of $N_{X\_i}$ is set to the maximum number $N_{X\_i}^{MAX}$ of scan lines that can be placed in the initial cross curvature adjustment bands, at step 622. If $\delta_C$ is greater than or equal to zero, then the above equation 33 is solved for $N_{X\_i}$ at step 623. If this value exceeds the maximum number $N_{X\_i}^{MAX}$, at step 624, then it is set to $N_{X\_i}^{MAX}$ at step 622. At step 625, the resulting cross curvature $P2_{EST}(X_{EST})$ is then estimated based on the value of $P2_T(X_T)$ resulting from the twist adjustment step and the change in cross curvature $\Delta P2(\Delta X_{X\_i})$. The value of $\Delta X_{X\_i}$ used at step 625 is given by the equation, $$\Delta X_{X\_i} = a_{X\_i} \cdot N_{X\_i} \qquad \text{Eq.35}$$

The values of $P2_{EST}$ ($X_{EST}$), $X_{TEST}$ and $N_{X\_i}$ are than passed back to calling step 602.

At step 606, the estimated cross curvature $X_{EST}$ is compared with the test cross curvature $X_{TEST}$. If the estimated cross curvature is greater than or equal to the test cross curvature $X_{TEST}$, the algorithm proceeds to step 609 to perform the initial adjustment step with $N_{C\_i}=0$ and the calculated value of $N_{X\_i}$ passed back from subroutine 610. If not, new parameters are sent to subroutine 610 from calling step 603. In calling step 603 parameter "P1" is now set to indicate cross curvature, X, and parameter "P2" is now set to indicate cross curvature, C. Index i is set to equal one.

In subroutine 610, $X_{TEST}$ remains the same, and since i=1, at step 612, the algorithm proceeds to step 614, where the algorithm sets a desired cross curvature $P1_{DES}$, ($X_{DES}$) equal to $X_{TEST}$. At step 615, the change in cross curvature $\Delta P1$ ($\Delta X_{X\_i}$) is determined based on the desired cross curvature $P1_{DES}$ ($X_{TEST}$) and the incoming cross curvature $X_T$ resulting from the twist operation. If $\Delta P1$ ($\Delta X_{X\_i}$) is less than zero, it is set to zero at step 617. At step 618, since P1=X, the linear equation 35 above is used, at step 619 to solve for $N_{X\_i}$. If this value is greater than the maximum value $N_{X\_i}^{MAX}$, then it is set to the maximum value, at step 622. Based on the value of $N_{X\_i}$, an estimate of the crown curvature $P2_{EST}$ ($C_{EST}$) is calculated at step 625 based on the crown curvature $P2_T$ ($C_T$) following the twist adjustment step and the change in crown curvature $\Delta P2$ ($\Delta C_{X\_i}$) given by equation 33 above. The values of $P2_{EST}$ (CEST), $X_{TEST}$ and $N_{X\_i}$ are then passed back to calling step 603.

At step 607, $C_{EST}$ is compared to the final crown curvature target $C_{MEAN}$. If $C_{EST}$ is less than or equal to $C_{MEAN}$, then the initial adjustment step is performed at step 609 given the values of $N_{C\_i}$ and $N_{X\_i}$. If CEST exceeds $C_{MEAN}$, then new parameters are passed to subroutine 610 by calling step 604. In step 604, the skew factor "s" is increased to relax the value of $X_{TEST}$ in step 611 of subroutine 610 to a smaller value since the estimated crown curvature $C_{EST}$ would have otherwise exceeded the final crown curvature target $C_{MEAN}$. New values of $P2_{EST}$ ($C_{EST}$), $X_{TEST}$ and $N_{X\_i}$ are then calculated and passed back to step 604. The new value of $C_{EST}$ is then compared to the upper limit of the crown curvature $C_{UL}$, less the overshoot guard factor $\alpha$. If $C_{EST}$ does not exceed $C_{UL}-\alpha$, at step 608, the algorithm proceeds to step 609 to perform the initial curvature adjustment with $N_{C\_i}$ and $N_{X\_i}$. If it does, the algorithm proceeds to step 605 to present new parameters to subroutine 610. The new parameters are chosen to redefine the change in crown curvature $\Delta C_{X\_i-i}$ so that the change in crown curvature does not push the crown curvature outside region A in FIG. 15. The parameter $P1_{EXT}$ ($C_{EXT}$) is now set such that the desired crown curvature $C_{DES}$ used in step 615 is $C_{UL}-\alpha$.

This keeps $\Delta C_{X\_i}$ from pushing $C_{EST}$ beyond region A in FIG. 15. A new value of $N_{X\_i}$ is then calculated and passed back to step 605 for performing initial adjustment step 609.

j. Final Curvature Adjustment Steps

Figure 25:
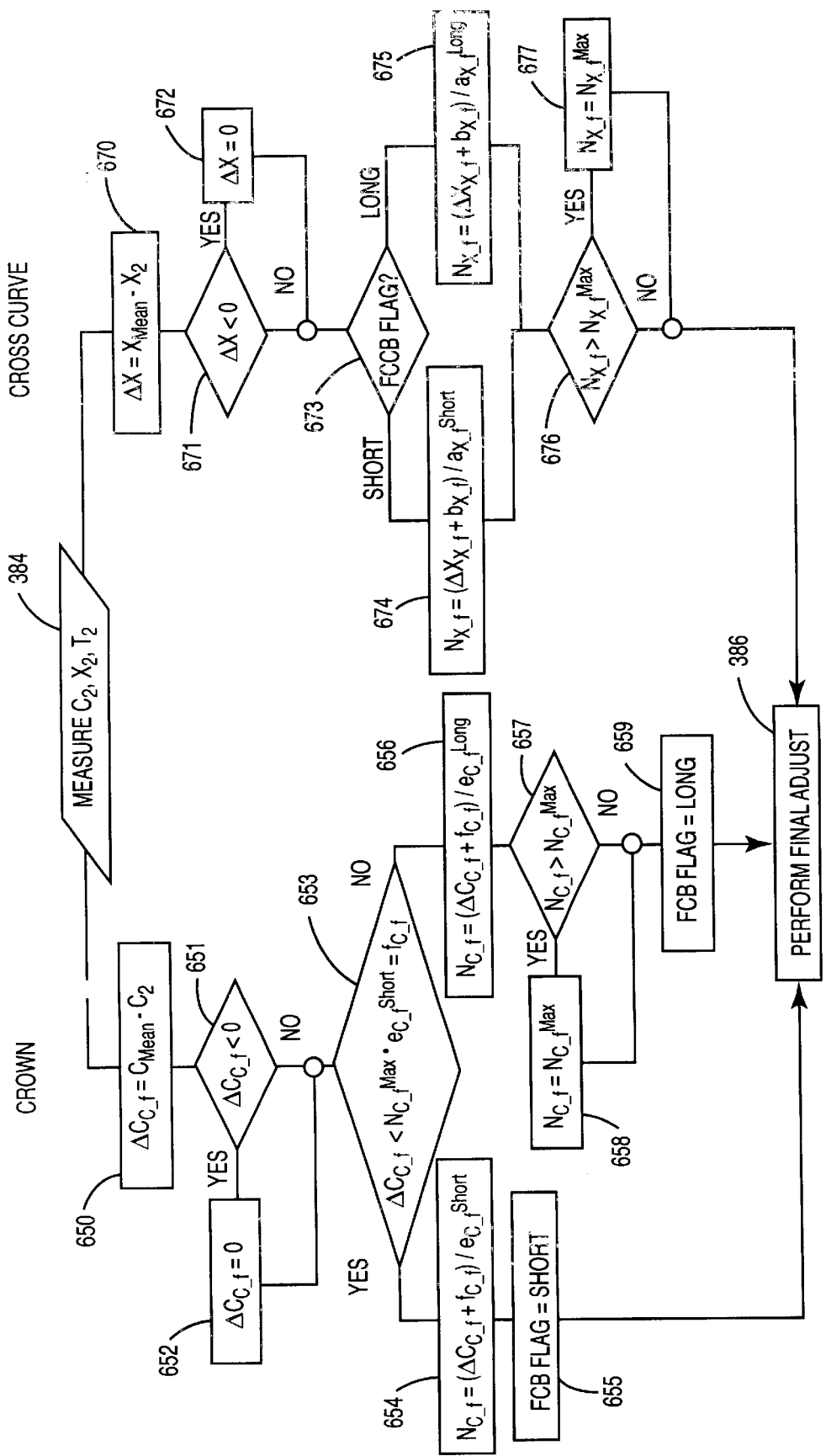
FIG. 25 illustrates the steps performed to calculate the number of scan lines $N_{C\_f}$ and $N_{X\_f}$ to be applied within the final crown and cross curvature adjust bands.

FIG. 25 illustrates the steps performed to calculate the number of scan lines $N_{C\_f}$ and $N_{X\_f}$ to be applied within the final crown and cross curvature adjust bands. The same reference numerals are used in FIG. 25 as were used in FIGS. 16 and 17 for the same or similar elements. At step 384, the crown, cross and twist values $C_2$, $X_2$ and $T_2$ resulting from the initial curvature adjustment step are measured. From these values, the desired final change in crown and cross curvatures are determined.

The final change in crown curvature $\Delta C_{C\_f}$ is determined at step 650 based on the final crown target $C_{MEAN}$ and the value of $C_2$. If $\Delta C_{C\_f}$ is less than zero, at step 651, it is set to zero at step 652. If, at step 653, the change in crown curvature $\Delta C_{C\_f}$ can be achieved with short laser scan lines in the final crown curvature band, then the algorithm calculates the number of short scan lines $N_{C\_f}$ that are required to achieve $\Delta C_{C\_f}$, at step 654. It has been found that short laser scan lines provide more accuracy in the curvature adjustment, but long laser scan lines provide more response. The final crown curvature band flag FCB is set to equal "short", at step 655.

If $\Delta C_{C\_f}$ cannot be achieved with short laser scan lines, as determined by step 653, then the algorithm determines the number of long laser scan lines $N_{C\_f}$ that are required to achieve $\Delta C_{C\_f}$, at step 656. If $N_{C\_f}$ is greater than the maximum number $N_{C\_f}^{MAX}$ that can be applied in the final crown curvature adjust band, at step 657, the algorithm sets $N_{C\_f}$ to equal the number of maximum number at step 658. At step 659, the algorithm sets the final crown curvature band flag equal to "long". The value of $N_{C\_f}$ and the FCB is then used to perform the final crown curvature adjustment at step 386.

Similarly, based on the value of $X_2$ and the final cross curvature target $X_{MEAN}$, the desired final change in cross curvature $\Delta X_{X\_f}$ is determined at step 670. If, at step 671, $\Delta X_{X\_f}$ is less than zero, it is set to zero at step 672. If, at step 673, the FCCB flag is short, the algorithm proceeds to step 674 to determine the appropriate number of short scan lines $N_{X\_f}$ needed to achieve the desired final cross curvature change $\Delta X_{X\_f}$. If the FCCB flag is "long" then the appropriate number of long laser scan lines $N_{X\_f}$ is determined at step 675. If the number of laser scan lines $N_{X\_f}$ is greater than the maximum number of scan lines $N_{X\_f}^{MAX}$ that can be applied in the final cross curvature adjust band, at step 676, then $N_{X\_f}$ is set to equal the maximum at step 677. The value of $N_{X\_f}$ is then used to perform the final cross curvature adjustment at step 386.

6. Summary

With the above described curvature control algorithm, the crown and cross curvature targets are not necessarily static as is typical in the prior art. Rather, the crown and cross curvature targets are dynamic as needed. The initial targets are determined based on the incoming crown, cross and twist curvature values. Also, based on these values, a decision is made as to whether to perform a twist adjustment step. Thus, the twist adjustment step is performed on a per-slider basis, rather than on a per-product type basis. The initial crown and cross curvature targets can be as small as the lower limits of the crown and cross curvature specifications provided by the user and as high as the upper limits of the specifications. This flexibility allows trade-offs to be made in the treatment process so all parameters have a chance to reach their specifications, which increases slider yield and reduces the overall curvature distribution.

Also, it has been found that the above-described algorithm is capable of tolerating moving averages of incoming curvatures better for both crown and cross curvature than prior curvature control algorithms. Crown curvature is not necessarily the driving parameter. Based on the incoming crown and cross curvature values, cross curvature values can become the primary active target.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, any method of producing localized changes in material stresses can be used with the present invention. One method of adjusting twist is to use heat from a continuous or non-continuous wave laser source in a selected pattern to produce localized changes in stress on the back surface of the slider. However, heat sources other than a laser can also be used to create localized changes in surface stress. Further, the surface stresses can be altered with techniques other than the use of heat. For example, various methods of surface shaping can be used, such as lapping, shot pinning, sand blasting, liquid honing, etc. The surface shaping mechanism can be selected to suit a particular application. Also, various changes can be made to the curvature control algorithm, such as the definition of the target and twist divider lines, the number of laser treatment steps and the definition of the capability window. Also, areas C1 and C2 can each be divided by a line defining whether the curvature targets for sliders within these areas are static or dynamic. Numerous other algorithm changes can also be made. The terms "crown curvature" and "cross curvature" used in the specification and claims are arbitrary terms and are interchangeable.

What is claimed is:

1. A method of controlling curvature of a disc head slider having a bearing surface, the method comprising:
   (a) obtaining measures of first and second curvature characteristics of the bearing surface; and
   (b) selecting a first material stress pattern to be applied to a working surface of the slider based on the measure of the first curvature characteristic and a first target value;
   (c) estimating a change to the second curvature characteristic due to application of the first material stress pattern to the working surface of the slider;
   (d) selectively changing the first target value and the first material stress pattern based on the change to the second curvature characteristic estimated in step (c); and
   (e) applying the first material stress pattern, as selectively changed in step (d), to the working surface of the slider to induce a change in the first curvature characteristic toward the first target value.

2. The method of claim 1 wherein:
   the selecting step (b) comprises determining a desired change in the first curvature characteristic based on the measure of the first curvature characteristic and a first target value and selecting the first material stress pattern based on the desired change;
   the estimating step (c) comprises estimating whether the change to the second curvature characteristic due to application of the first material stress pattern will cause the second curvature characteristic to reach a selected value; and the selectively changing step (d) comprises changing the first target value and the first material stress pattern if the change to the second curvature characteristic will not cause the second curvature characteristic to reach the selected value.

3. The method of claim 2 wherein the selectively changing step (d) further comprises, if the change to the second curvature characteristic will not cause the second curvature characteristic to reach the selected value:

(d)(1) estimating a change to the second curvature characteristic needed to move the second curvature characteristic to the selected value; and (d)(2) changing the first material stress pattern such that the first material stress pattern will cause the change to the second curvature characteristic when applied to the working surface of the slider in step (e).

4. The method of claim 3 wherein the selectively changing step (d) further comprises:

(d)(3) defining a respective lower limit, nominal target value and upper limit for the first and second curvature characteristics;

(d)(4) estimating whether the change to the first curvature characteristic due to application of the first material stress pattern, as changed in step (d)(2), to the working surface of the slider will cause the first curvature characteristic to exceed the respective nominal target value for the first curvature characteristic; and (d)(5) estimating a change to the second curvature characteristic needed to move the second curvature characteristic to the respective lower limit for the second curvature characteristic; and (d)(6) changing the first material stress pattern such that the first material stress pattern will cause the change needed to move the second curvature characteristic to the respective lower limit, if the change to the first curvature characteristic due to application of the first material stress pattern, as changed in step (d)(2), to the working surface of the slider will cause the first curvature characteristic to exceed the nominal target value.

5. The method of claim 4 wherein the selectively changing step (d) further comprises:

(d)(7) estimating whether the change to the first curvature characteristic due to application of the first material stress pattern, as changed in step (d)(6), to the working surface of the slider will cause the first curvature characteristic to exceed the upper limit for the first curvature characteristic;

and (d)(8) estimating a change to the first curvature characteristic needed to move the first curvature characteristic to the upper limit for the first curvature characteristic; and (d)(9) changing the first material stress pattern such that the first material stress pattern will cause the change needed to move the first curvature characteristic to the upper limit for the first curvature characteristic, if the change to the first curvature characteristic due to application of the first material stress pattern, as changed in step (d)(6), to the working surface of the slider will cause the first curvature characteristic to exceed the respective upper limit.

6. The method of claim 1 and further comprising:

(f) obtaining measures of first and second curvature characteristics after applying the first material stress pattern to the working surface; and (g) selecting a second material stress pattern to be applied to the working surface of the slider based on the measure of the first curvature characteristic obtained in step (f) and a final target value for the first curvature characteristic;

(h) selecting a third material stress pattern to be applied to the working surface of the slider based on the measure of the second curvature characteristic obtained in step (f) and a final target value for the second curvature characteristic; and (i) applying the second and third material stress patterns to the working surface of the slider to induce a change in the first curvature characteristic toward the final target value for the first curvature characteristic and a change in the second curvature characteristic toward the final target value for the second curvature characteristic.

7. A method of controlling curvature of a disc head slider having a bearing surface, the method comprising:

(a) defining a respective specification range, including a nominal value, for twist, crown and cross curvatures of the bearing surface;

(b) obtaining a measure of the twist, crown and cross curvatures of the bearing surface; and (c) selectively altering material stresses on a working surface of the slider in a first pattern that is selected to induce a desired change in the twist curvature based on the measure of the twist curvature, the specification range for the twist curvature and estimated responses in the crown and cross curvatures to the first pattern; and (d) selectively altering material stresses on the working surface in a second pattern that is selected to induce a change in at least one of the crown and cross curvatures based on the specification ranges for the crown and cross curvatures and estimated responses in the crown and cross curvatures to the second pattern.

8. The method of claim 7 wherein step (c) comprises:

(c)(1) defining the desired change in the twist curvature such that the first pattern adjusts the twist curvature toward the nominal value for the twist curvature; and (c)(2) reducing the desired change in the twist curvature if the first pattern would cause either the crown or cross curvature to exceed the respective specification range.

9. The method of claim 7 wherein step (d) comprises:

(d)(1) omitting the step of altering material stresses in the second pattern in step (d) if the crown and cross curvatures following step (c) are in the specification ranges for the crown and cross curvatures.

10. The method of claim 7 and further comprising:

(e) obtaining measures of the crown and cross curvatures after steps (c) and (d);

(f) selectively altering material stresses on the working surface in a third pattern that is selected to induce a change in the crown curvature from the measure of the crown curvature obtained in step (e) toward a final crown curvature target; and (g) selectively altering material stresses on the working surface in a fourth pattern that is selected to induce a change in the cross curvature from the measure of the cross curvature obtained in step (e) toward a final cross curvature target.

11. The method of claim 7 wherein step (d) comprises:
(d)(1) defining initial targets for the crown and cross curvatures;
(d)(2) defining a material stress adjustment pattern that would adjust the crown curvature to the respective initial target for the crown curvature;
(d)(3) identifying a cross curvature divider value which, based on an estimated response in the cross curvature, would be adjusted to the respective initial target for the cross curvature in response to the material stress adjustment pattern defined in step (d)(2); and
(d)(4) selecting the second pattern from a function that is dependent on whether the cross curvature is greater than or less than the cross curvature divider value.

12. The method of claim 7 wherein step (d) comprises:
(d)(1) defining initial targets for the crown and cross curvatures;
(d)(2) selecting the second pattern such that application of the second pattern to the working surface would cause one of the crown and cross curvatures to move toward its respective initial target;
(d)(3) estimating a change to the other of the crown and cross curvatures due to application of the second pattern to the working surface;
(d)(4) selectively changing the respective initial target and the second pattern based on the change to the other of the crown and cross curvatures estimated in step (d)(3); and
(d)(5) applying the second pattern, as selectively changed in step (d)(4), to the working surface of the slider.

13. The method of claim 7 wherein step (c) comprises:
(c)(1) estimating responses in the crown and cross curvatures to the first pattern;
(c)(2) performing the step of altering material stresses in the first pattern on the working surface of the slider if the measure of the twist curvature exceeds a predetermined twist value, irrespective of the estimated responses in the crown and cross curvatures to the first pattern; and
(c)(3) if the measure of the twist curvature does not exceed the predetermined twist value, then:
  (c)(3)(i) defining a crown curvature twist divider value;
  (c)(3)(ii) defining a material stress adjustment pattern that would adjust the crown curvature to the crown curvature twist divider value;
  (c)(3)(iii) identifying a cross curvature twist divider value which, based on an estimated response in the cross curvature, would be adjusted to a selected value in response to the material stress adjustment pattern defined in step (c)(3)(ii); and
  (c)(3)(iv) performing the step of altering material stresses in the first pattern on the working surface of the slider if the cross curvature is at least as great as the cross curvature twist divider value.

14. The method of claim 7 and further comprising:
(e) obtaining a measure of the crown and cross curvatures of the bearing surface after performing step (c); and
wherein the material stresses selectively altered in step (d) are selectively altered in the second pattern, which is selected to induce the change in at least one of the crown and cross curvatures based on the measures of the crown and cross curvatures obtained in step (e), the specification ranges for the crown and cross curvatures and the estimated responses in the crown and cross curvatures to the second pattern.

15. A method of controlling curvature of a disc head slider having a bearing surface, the method comprising:
(a) obtaining a measure of twist, crown and cross curvatures of the bearing surface; and
(b) selecting a first material stress pattern for inducing a change in the twist curvature in response to application of the first material stress pattern to a working surface of the slider, based on the measure of the twist curvature obtained in step (a);
(c) estimating a response in at least one of the crown and cross curvatures to the first material stress pattern due to application of the first material stress pattern to the working surface of the slider;
(d) selectively applying or not applying the first material stress pattern to the working surface of the slider, based on the estimated response in at least one of the crown and cross curvatures;
(e) selecting a second material stress pattern for inducing a change in at least one of the crown and cross curvatures in response to application of the second material stress pattern to the working surface of the slider; and
(f) applying the second material stress pattern to the working surface of the slider.

16. The method of claim 15 wherein step (b) comprises:
(b)(1) defining a respective specification range, including a nominal value, for twist, crown and cross curvatures of the bearing surface;
(b)(2) defining a desired change needed to move the twist curvature measured in step (a) to the nominal value for the twist curvature defined in step (b)(1);
(b)(3) selecting the first material stress pattern such that application of the first material stress pattern to the working surface of the slider would induce the desired change; and
(b)(4) reducing the desired change used in step (b)(3) if the estimated response in at least one of the crown and cross curvatures due to application of the first material stress pattern to the working surface of the slider would cause either the crown or cross curvature to exceed the respective specification range.

17. The method of claim 15 wherein step (d) comprises:
(d)(1) applying the first material stress pattern to the working surface of the slider if the measure of the twist curvature exceeds a predetermined twist value, irrespective of the estimated response obtained in step (c); and
(d)(2) if the measure of the twist curvature does not exceed the predetermined twist value, then:
  (d)(2)(i) defining a crown curvature twist divider value;
  (d)(2)(ii) defining a material stress adjustment pattern that would adjust the crown curvature to the crown curvature twist divider value;
  (d)(2)(iii) identifying a cross curvature twist divider value which, based on an estimated response in the cross curvature, would be adjusted to a selected value in response to the material stress adjustment pattern defined in step (d)(2)(ii); and
  (d)(2)(iv) applying the first material stress pattern to the working surface of the slider if the cross curvature is at least as great as the cross curvature twist divider value.

* * * * *

UNITED STATES PATENT AND TRADEMARK OFFICE
CERTIFICATE OF CORRECTION

PATENT NO. : 6,441,385 B1
DATED : August 27, 2002
INVENTOR(S) : Khlif

It is certified that error appears in the above-identified patent and that said Letters Patent is hereby corrected as shown below:

Column 18,
Equation 12, change "$\delta f_{C\_i}^2 + 4.e_{C\_i}.\Delta C_{DIV}$" to -- $\delta = f_{C\_i}^2 + 4.e_{C\_i}.\Delta C_{DIV}$ --.

Column 20,
Equation 19, change "$\delta_C = f_{C\_i}^2 + 4.e_{C\_i}$" to -- $\delta_C = f_{C\_i}^2 + 4.e_{C\_i}.\Delta C_{C\_i}$ --.

Column 22,
Equation 24, change "$\Delta C_{C,X\_i} = c_{X\_i}.N_{X\_i}^2 + d_{X\_i}.N_{X\_i} + e_{C\_i}.N_{C\_i} +^2 f_{C\_i}.N_{C\_i}$" to
-- $\Delta C_{C,X\_i} = c_{X\_i}.N^2_{X\_i} + d_{X\_i}.N_{X\_i} + e_{C\_i}.N^2_{C\_i} + f_{C\_i}.N_{C\_i}$ --.
Equation 26, change "$\lambda.N_{X\_i}^2 + \omega.N_{X\_i} + \omega = 0$" to -- $\lambda.N_{X\_i}^2 + \omega.N_{X\_i} + \phi = 0$ --.

Signed and Sealed this

Eleventh Day of March, 2003

JAMES E. ROGAN
*Director of the United States Patent and Trademark Office*